(12) United States Patent
Eun

(10) Patent No.: US 10,546,112 B2
(45) Date of Patent: Jan. 28, 2020

(54) APPARATUS, AUTHENTICATION PROCESS METHOD, AND COMPUTER PROGRAM PRODUCT

(71) Applicant: Jongsook Eun, Tokyo (JP)

(72) Inventor: Jongsook Eun, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 188 days.

(21) Appl. No.: 15/233,546

(22) Filed: Aug. 10, 2016

(65) Prior Publication Data

US 2017/0052587 A1    Feb. 23, 2017

(30) Foreign Application Priority Data

Aug. 17, 2015  (JP) .................................. 2015-160690
May 30, 2016   (JP) .................................. 2016-107427

(51) Int. Cl.
*G06F 1/32*     (2019.01)
*G06F 1/26*     (2006.01)
*G06F 1/00*     (2006.01)
*G06F 21/34*    (2013.01)
*G06F 21/30*    (2013.01)
(Continued)

(52) U.S. Cl.
CPC ............... *G06F 21/34* (2013.01); *G06F 1/32* (2013.01); *G06F 1/3203* (2013.01); *G06F 1/325* (2013.01); *G06F 1/3206* (2013.01); *G06F 1/3215* (2013.01); *G06F 1/3228* (2013.01); *G06F 1/3246* (2013.01); *G06F 1/3265* (2013.01); *G06F 1/3284* (2013.01); *G06F 1/3287* (2013.01); *G06F 21/30* (2013.01);
(Continued)

(58) Field of Classification Search
None
See application file for complete search history.

(56) References Cited

U.S. PATENT DOCUMENTS 7,426,047 B2   9/2008  Endo
7,730,225 B2   6/2010  Mizuno et al.
(Continued)

FOREIGN PATENT DOCUMENTS

JP    2001-202224    7/2001
JP    2003-195986    7/2003
(Continued)

*Primary Examiner* — Tanh Q Nguyen
(74) *Attorney, Agent, or Firm* — Oblon, McClelland, Maier & Neustadt, L.L.P.

(57) ABSTRACT

An apparatus includes: a first unit configured to provide a given function; and a second unit configured to be connected to the first unit. The second unit includes: an acquisition unit configured to acquire authentication information from an authentication medium; an authentication unit configured to use the acquired authentication information to perform a user authentication process that enables the use of the function of the first unit; and a first power management unit configured to, when the first unit transitions to an energy-saving mode in which power consumption is reduced by stopping power supply to a given hardware resource, cause the second unit to transition to the energy-saving mode while the acquisition unit is kept in a driven state and, on the user authentication process, recover the second unit from the energy-saving mode such that the authentication unit performs the user authentication process.

15 Claims, 11 Drawing Sheets

(51) Int. Cl.
*G06F 21/31* (2013.01)
*G06F 1/3206* (2019.01)
*G06F 1/3287* (2019.01)
*G06F 1/3215* (2019.01)
*G06F 1/3234* (2019.01)
*G06F 1/3203* (2019.01)
*G06F 1/3246* (2019.01)
*G06F 1/3228* (2019.01)

(52) U.S. Cl.
CPC ............ *G06F 21/31* (2013.01); *Y02D 10/153* (2018.01); *Y02D 10/171* (2018.01)

(56) References Cited

U.S. PATENT DOCUMENTS

| | | | |
|---|---|---|---|
| 8,972,584 | B2 | 3/2015 | Sojian |
| 9,112,891 | B2 | 8/2015 | Pathak |
| 9,146,731 | B2 | 9/2015 | Ohara |
| 9,614,982 | B2 * | 4/2017 | Chiyo ................ H04N 1/00204 |
| 2006/0171005 | A1 | 8/2006 | Eun |
| 2008/0235434 | A1 | 9/2008 | Eun et al. |
| 2010/0149574 | A1 | 6/2010 | Eun et al. |
| 2010/0205449 | A1 | 8/2010 | Eun et al. |
| 2011/0015796 | A1 * | 1/2011 | Heydron ................ G08C 17/02 700/286 |
| 2011/0181903 | A1 * | 7/2011 | Katsuyanna ......... H04N 1/0035 358/1.14 |
| 2012/0011580 | A1 | 1/2012 | Eun et al. |
| 2012/0140263 | A1 * | 6/2012 | Oba .................... H04N 1/00222 358/1.14 |
| 2013/0124895 | A1 * | 5/2013 | Saha ........................ G06F 1/26 713/323 |
| 2013/0321847 | A1 | 12/2013 | Eun |
| 2013/0344809 | A1 * | 12/2013 | Aliyath ............... H04W 88/182 455/41.2 |
| 2014/0130028 | A1 | 5/2014 | Maeda et al. |
| 2014/0245414 | A1 | 8/2014 | Eun |
| 2016/0217084 | A1 | 7/2016 | Eun |
| 2016/0275274 | A1 | 9/2016 | Eun |
| 2017/0052587 | A1 * | 2/2017 | Eun ........................ G06F 21/34 |

FOREIGN PATENT DOCUMENTS

| | | |
|---|---|---|
| JP | 2004-112718 | 4/2004 |
| JP | 2010-092456 | 4/2010 |
| JP | 4856620 | 11/2011 |
| JP | 4974749 | 4/2012 |
| JP | 5031862 | 7/2012 |
| JP | 2013-092786 | 5/2013 |
| JP | 2014-093059 | 5/2014 |
| JP | 2014-179021 | 9/2014 |
| JP | 2015-176502 | 10/2015 |
| JP | 2016-177544 A | 10/2016 |

* cited by examiner

FIG.4

CARD ID
01010310DA09D027

APPARATUS, AUTHENTICATION PROCESS METHOD, AND COMPUTER PROGRAM PRODUCT

CROSS-REFERENCE TO RELATED APPLICATIONS

The present application claims priority under 35 U.S.C. § 119 to Japanese Patent Application No. 2015-160690 filed on Aug. 17, 2015 and Japanese Patent Application No. 2016-107427 filed on May 30, 2016. The contents of which are incorporated herein by reference in their entirety.

BACKGROUND OF THE INVENTION

1. Field of the Invention

The present invention relates to an apparatus, an authentication process method, and a computer program product.

2. Description of the Related Art

Recently, image forming apparatuses, such as a multi-function peripheral (MFP) having various functions including including a copy function, a scanner function, a facsimile function and a printer function, a laser printer, or an apparatus (for example, a scanner device, a facsimile device, etc.,) having one of the above-listed various functions are known. A card reader device is connectable to the apparatus main unit of an image forming apparatus. In an energy-saving mode that reduces power consumption of the apparatus main unit, when an integrated circuit (IC) card is moved closer to the card reader device that is connected to the apparatus main unit, a contactless wireless communication is performed and the apparatus main unit recovers from the energy-saving mode. Then, on the basis of the data that is read from the IC card, the apparatus main unit performs a user authentication process and, when the user is authenticated as an authorized user, the function of the image forming apparatus becomes usable.

When a non-operation state continues for a given time after transition to an energy-saving mode, a conventional image forming apparatus transitions to an engine-off mode that further reduces power consumption. In the engine-off mode, power supply to the card reader device from the apparatus main unit stops. For this reason, there is a problem in that, even when an IC card is moved closer to the card reader device, contactless wireless communications cannot be performed and the apparatus main unit cannot be recovered from the engine-off mode, which makes it difficult to perform user authentication.

In this case, a power button is operated to recover the conduction state of the apparatus main unit and the IC card is moved closer to the card reader device to perform user authentication. The conventional image forming apparatus is provided with a setting for inhibiting transition to the engine-off mode. When a setting for inhibiting transition to the engine-off mode is made, however, the time of conduction through resources, such as the HDD of the apparatus main unit, the plotter, and the engine of the scanner, increases and therefore there is a risk that the life of the resources will shorten.

Furthermore, user authentication is performed by using a local address book of the apparatus main unit or an authentication server device that is connected to the apparatus main unit via a network. For this reason, to perform user authentication in the energy-saving mode, the apparatus main unit is started and the apparatus main unit refers to the local address book stored in the hard disk drive (HDD), or communicates with the authentication server device on the network, to perform user authentication. For this reason, the apparatus main unit is started each time user authentication is performed and therefore there is a risk that the life of the resources will shorten.

SUMMARY OF THE INVENTION

Exemplary embodiments of the present invention, there is provided an apparatus comprising: a first unit configured to provide a given function; and a second unit configured to be connected to the first unit, the second unit including: an acquisition unit configured to acquire authentication information from an authentication medium; an authentication unit configured to use the acquired authentication information to perform a user authentication process that enables the use of the function of the first unit; and a first power management unit configured to, when the first unit transitions to an energy-saving mode in which power consumption is reduced by stopping power supply to a given hardware resource, cause the second unit to transition to the energy-saving mode while the acquisition unit is kept in a driven state and, on the user authentication process, recover the second unit from the energy-saving mode such that the authentication unit performs the user authentication process.

Exemplary embodiments of the present invention also provide an authentication process method performed by an authentication system including a first unit that provides a given function and a second unit that is connected to the first unit, the authentication process method comprising: acquiring authentication information from an authentication medium, the acquiring performed by an acquisition unit of the second unit; using the acquired authentication information to perform a user authentication process that enables the use of the function of the first unit, the using performed by an authentication unit of the second unit; and when the first unit transitions to an energy-saving mode in which power consumption is reduced by stopping power supply to a given hardware resource, causing the second unit to transition to the energy-saving mode while the acquisition unit is kept in a driven state and, on the user authentication process, recovering the second unit from the energy-saving mode such that the authentication unit performs the user authentication process, the causing and the recovering performed by a first power management unit of the second unit.

Exemplary embodiments of the present invention also provide a computer program product containing an authentication process program executed by an authentication system including a first unit that provides a given function and a second unit that is connected to the first unit, the program causes a computer of the second unit to execute; acquiring authentication information from an authentication medium, the acquiring performed by an acquisition unit of the second unit; using the acquired authentication information to perform a user authentication process that enables the use of the function of the first unit, the using performed by an authentication unit of the second unit; and when the first unit transitions to an energy-saving mode in which power consumption is reduced by stopping power supply to a given hardware resource, causing the second unit to transition to the energy-saving mode while the acquisition unit is kept in a driven state and, on the user authentication process, recovering the second unit from the energy-saving mode such that the authentication unit performs the user authentication process, the causing and the recovering performed by a first power management unit of the second unit.

BRIEF DESCRIPTION OF THE DRAWINGS

FIG. 4 is a diagram illustrating a card ID that is stored in an IC card that is used in the MFP of the first embodiment;

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
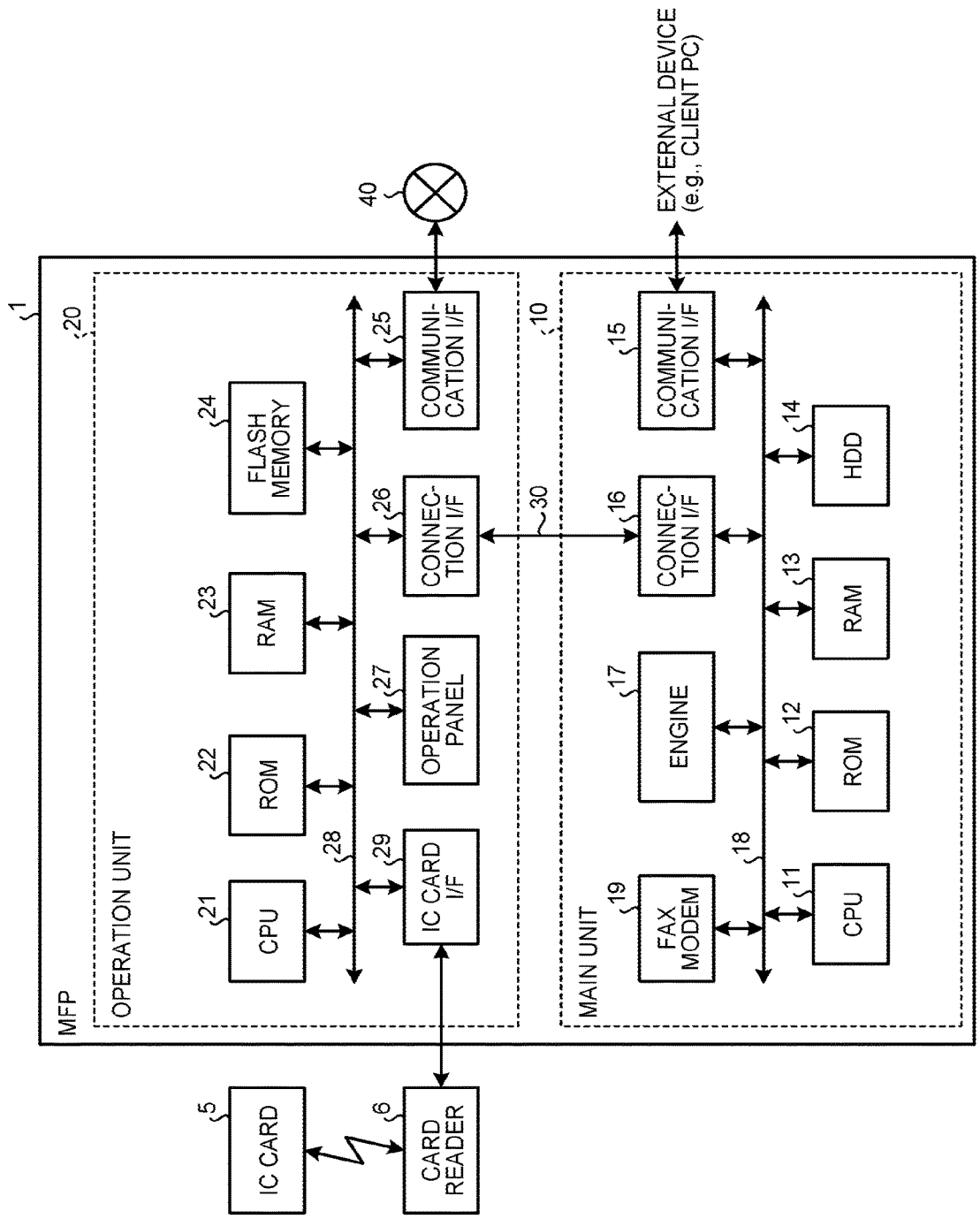
FIG. 1 is a hardware configuration diagram of a MFP of a first embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

With reference to the accompanying drawings, a multi-function peripheral or an authentication system of an embodiment to which the present invention is applied will be described in detail below.

First Embodiment

FIG. 1 is a hardware configuration diagram of a multi-function peripheral (MFP) 1 of a first embodiment of the present invention. The MFP 1 is an exemplary apparatus and the authentication system. The MFP 1 includes, as shown in FIG. 1, for example, a main unit 10 having various functions including a copy function, a scanner function, a facsimile function, and a printer function, and an operation unit 20 that accepts inputs corresponding to user operations. The main unit 10 is an exemplary first unit and the operation unit 20 is an exemplary second unit.

The main unit 10 and the operation unit 20 are communicably connected to each other via a dedicated communication path 30. As the communication path 30, for example, one according to the USB (universal serial bus) standard may be used; however, the communication path 30 may accord to any standard. The main unit 10 may have one or multiple functions of image generation functions including the copy function, the scanner function, the facsimile function, and the printer function.

An electronic device capable of performing information processing that completes independently can be used as the operation unit 20. For example, an information processing terminal, such as a smartphone or a tablet terminal, can be used as the operation unit 20. In this case, the information processing terminal that is used as the operation unit 20 functions as an operation unit of the MFP 1.

More specifically, instead of an operation panel that is fixed and set conventionally as an operation unit dedicated to the MFP 1, the information processing terminal that is used as the operation unit 20 is detachably connected to the MFP 1. In other words, the information processing terminal that is used as the operation unit 20 is set detachably (separably) in a given position, such as one in which the operation panel of the MFP 1 is disposed, but is set integrally with the MFP 1. Accordingly, the information processing terminal that is used as the operation unit 20 and the MFP 1 may be regarded as a single apparatus. Once detached from the MFP 1, the information processing terminal serving as the operation unit 20 performs wireless communications, such as Bluetooth communications or infrared communications, with the MFP 1 and functions as the operation unit of the MFP 1.

The main unit 10 performs operations according to inputs accepted by the operation unit 20. The main unit 10 is communicable with an external device, such as a client PC (personal computer), and performs operations according to instructions received from an external device.

Hardware Configuration of Main Unit

The hardware configuration of the main unit 10 will be described here. As shown in FIG. 1, the main unit 10 includes a CPU 11, a ROM 12, a RAM 13, and a hard disk drive (HDD) 14. The main unit 10 includes a communication interface (I/F) 15, a connection I/F 16, an engine 17, and a facsimile modem (FAX modem) 19. The components of the main unit 10 are connected with one another via a system bus 18.

The CPU 11 controls overall operations of the main unit 10. The CPU 11 uses the RAM 13 as a work area and executes a program that is stored in the ROM 12 or the HDD 14 to control overall operations of the main unit 10 and implement various functions including the copy function, the scanner function, the facsimile function, and the printer function that are listed above.

Figure 2:
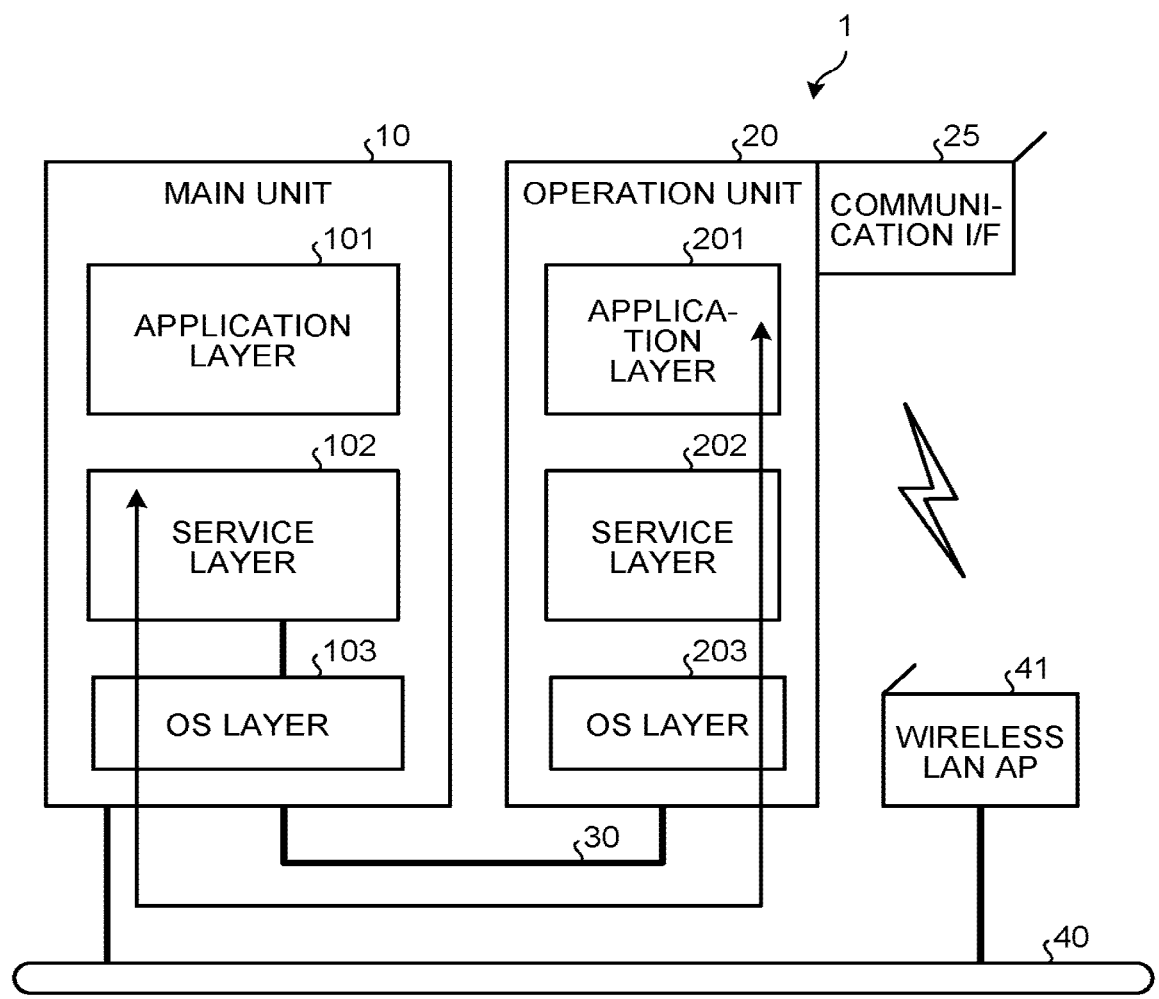
FIG. 2 is a software configuration diagram of the MFP of the first embodiment.

The communication I/F 15 is an interface for communicating with the external device, such as a client PC (personal computer), a Web server device, or an authentication server device, on a network 40. The connection I/F 16 is an interface for communicating with the operation unit 20 via the communication path 30. FIGS. 1 and 2 illustrate the communication path 30 as a wire path; however, as described above, the operation unit 20 is attachable to and detachable from the main unit 10 of the MFP 1. For this reason, when the operation unit 20 is attached to the MFP 1, the communication path 30 functions as a wire communication path and, when the operation unit 20 is detached from the MFP 1, the communication path 30 functions as a wireless communication path.

The engine 17 is hardware that performs processing, excluding general-purpose information processing and communications, for implementing the copy function, the scanner function, the facsimile function, and the printer function, etc. The engine 17 includes, for example, a scanner that scans an image of an original, a plotter that performs printing on a sheet material, such as paper, and a facsimile communication unit that performs facsimile communications. Furthermore, the engine 17 may include a specific option, such as a finisher that sorts printed sheet materials or an auto document feeder (ADF) that automatically feeds originals.

The HDD 14 is provided with storage areas respectively for, for example, an address book, login success history information, and operating mode information. In the storage area for an address book, master information that is generated by associating user identification information (user ID) on a user who is permitted to use the MFP 1 and the card ID and password of an IC card that is lent (issued) to the user is stored with respect to each user.

In the storage area for the login success history, the date at which operating the MFP 1 was permitted according to a login operation, the card ID of an IC card that is used for the login operation, and the user ID of a user corresponding to the card ID are stored in association with one another. The master information, etc., may be stored in a storage medium, such as an SD card (trademark) or a universal serial bus (USB) memory.

In the storage area for the operating mode information, is stored operating mode information representing an operating mode, such as a "login performance prioritized mode" or a "main unit energy-saving prioritized mode" to be described below, to which the main unit 10 and the operation unit 20 are caused to transition on transition to energy-saving modes.

User authentication using an IC card is exemplified here; however, various information terminals, such as a smartphone and a mobile phone, having a function used for user authentication (or in which an application is installed) may be used as the authentication device to implement the same function as that implemented with an IC card. The first embodiment will be described as one in which an "IC card" is used for user authentication; however, any storage medium may be used if the storage medium is capable of storing user information. For this reason, the storage medium is not limited to an IC card or an ID card.

Hardware Configuration of Operation Unit

The hardware configuration of the operation unit 20 will be described here. As shown in FIG. 1, the operation unit 20 includes a CPU 21, a ROM 22, a RAM 23, a flash memory 24, a communication I/F 25, a connection I/F 26, an operation panel 27, and an IC card I/F 29 that are connected with one another via a system bus 28.

The CPU 21 controls overall operations of the operation unit 20. The CPU 21 uses the RAM 23 as a work area and executes a program that is stored in, for example, the ROM 22 to control entire operations of the operation unit 20. As described below, the CPU 21 executes the user authentication program that is stored in, for example, the ROM 22 to implement a user authentication operation, which will be described below. The communication I/F 25 is an interface for communicating with the authentication server device on the network 40. The connection I/F 26 is an interface for communicating with the main unit 10 via the communication path 30.

The IC card I/F 29 is connected to a card reader 6 that is an exemplary acquisition unit via, for example, a USB cable. The card reader 6 performs contactless wireless communications with an IC card 5 that is held against the card reader 6 by the user when an operation for logging in the MFP 1 is performed and reads the authentication information including the card ID and the user information that is stored in the IC card 5. As the card reader 6, any card reader may be used as long as the card reader is capable of reading user information from a storage medium, such as an IC card or an ID card.

The exemplary first embodiment will be described as an embodiment where the card reader 6 and the operation unit 20 that are physically different from each other are connected via a USB cable of the first embodiment; however, the card reader 6 may be incorporated in the operation unit 20. In other words, the operation unit 20 and the card reader 6 may be formed integrally (may be formed as a single device).

In the RAM 23 (or another storage unit, such as the flash memory 24), for example, a storage area for the address book, a storage area for a login-success history, a storage area for a prioritized user list, and a storage area for operating modes are provided. In the storage area for the address book in the RAM 23, master information of the address book that is acquired from, for example, the HDD 14 of the main unit 10 is stored. The master information that is acquired from the main unit 10 may be stored in a storage medium, such as an SD card (trademark) or a USB memory. In the storage area in the RAM 23 for the login success history, the login success history that is acquired from, for example, the HDD 14 of the main unit 10 is stored.

Furthermore, for example, in the storage area in the RAM 23 for the prioritized user list corresponding to the login success history, given number of sets of login success history information each containing a user ID, a card ID, and a login date among the login success history that is acquired from the HDD 14 is stored according to the descending order of login dates. The prioritized user list is a list representing users subjected to user authentication.

The prioritized users are users corresponding to the login success history that is acquired from, for example, the HDD 14 of the main unit 10. In other words, as described below, the MFP 1 of the first embodiment acquires a new login success history of a given number of users among the login success history that is stored in the main unit 10. Each of the users corresponding to the login success history of the given number of users completes user authentication by only holding the IC card 5 against the card reader 6 and accordingly the functions of the MFP 1 becomes usable. In this manner, the functions of the MFP 1 are usable preferentially by the users corresponding to the login success history acquired from the main unit 10 and the users will be referred to as "prioritized users" in the MFP 1 of the first embodiment.

In the storage area for operating modes, is stored operating mode information representing operating modes, such as an "engine life prioritized mode" to be described below, to which the main unit 10 and the operation unit 20 are recovered upon recovery from the energy-saving mode.

When the card ID that is read from the IC card 5 in the login operation is registered in the prioritized user list, the CPU 21 of the operation unit 20 authenticates the user as an authorized user and permits the use of the functions of the MFP 1 according to the authority of the user. Accordingly, it is possible to complete user authentication in few seconds after the IC card 5 is held against the card reader 6 in the login operation and allow the use of the MFP 1.

The operation panel 27 is configured of a liquid crystal display (LCD) including a touch sensor. The operation panel 27 accepts various inputs corresponding to user operations and displays various types of information, such as information corresponding to the accepted inputs, information representing the operating condition of the MFP 1, and information representing a setting state. The operation panel 27 may be configured of an organic EL display including a touch sensor. In addition to, or instead of, the organic EL display, an operation unit, such as hardware keys, or a display unit, such as a light emitter, may be provided.

Software Configuration of MFP

FIG. 2 shows an exemplary software configuration of the MFP 1. As shown in FIG. 2, the main unit 10 includes an application layer 101, a service layer 102, and an OS layer 103. The entity of the application layer 101, the service layer 102, and the OS layer 103 is various types of software that is stored in, for example, the ROM 12 or the HDD 14. The CPU 11 executes the various types of software to provide various functions.

The software of the application layer 101 is application software (hereinafter, it may be referred simply as "applications") for causing hardware resources to operate to provide given functions. As applications, for example, there are a copy application for providing the copy function, a scanner application for providing the scanner function, a facsimile application for providing a facsimile function, and a printer application for providing the printer function.

The software of the service layer 102 is between the application layer 101 and the OS layer 103. The software of the service layer 102 is software that provides an interface for using the hardware resources of the main unit 10 to the applications. Specifically, it is software for providing a function for accepting operation requests to hardware resources and adjusting the operation requests. The operation requests accepted by the service layer 102 are, for example, a request for reading by the scanner and a request for printing by the plotter.

The interface function provided by the service layer 102 is provided not only to the application layer 101 of the main unit 10 but also to an application layer 201 of the operation unit 20. In other words, the application layer 201 (application) of the operation unit 20 is also able to implement the functions using the hardware resources (for example, the engine 17) of the main unit 10 via the interface function of the service layer 102.

The software of the OS layer 103 is basic software (an operating system) for providing basic functions for controlling the hardware of the main unit 10. The software of the service layer 102 converts requests for the use of hardware resources from various applications to commands that are interpretable by the OS layer 103 and passes the commands to the OS layer 103. The software of the OS layer 103 executes the commands and accordingly the hardware resources perform operations according to the requests from the applications.

Similarly, the operation unit 20 includes the application layer 201, a service layer 202, and an OS layer 203. The application layer 201, the service layer 202, and the OS layer 203 of the operation unit 20 have the same layer structure as that of the main unit 10. Note that the function provided by the application of the application layer 201 and the types of operation requests acceptable by the service layer 202 are different from those of the main unit 10. The application of the application layer 201 is software for providing a given function by causing the hardware resource of the operation unit 20 to operate. It is software mainly for providing the function of a user interface (UI) for performing operations relating to the functions of the main unit 10 (the copy function, the scanner function, the facsimile function, and the printer function) and for making displays.

In the exemplary first embodiment, in order to maintain independency between the functions, the software of the OS layer 103 of the main unit 10 and the software of the OS layer 203 of the operation unit 20 are different from each other. In other words, the main unit 10 and the operation unit 20 operate independently of each other on operating systems that are different from each other. For example, Linux (Trademark) may be used as the software of the OS layer 103 of the main unit 10 and Android (Trademark) may be used as the software of the OS layer 203 of the operation unit 20.

Operating the main unit 10 and the operation unit 20 on the different operating systems causes communications between the main unit 10 and the operation unit 20 not between processes in a common device but between different devices. The communications correspond to, for example, an operation (command communication) of the operation unit 20 to transmit an accepted input (the content of an instruction from the user) to the main unit 10 and an operation of the main unit 10 to notify the operation unit 20 of an event. Here, the operation unit 20 communicates a command to the main unit 10 and accordingly the function of the main unit 10 can be used. The event of which the operation unit 20 is notified by the main unit 10 is, for example, the operation execution condition in the main unit 10 and the content of a setting made in the main unit 10.

In the exemplary first embodiment, because power is supplied to the operation unit 20 from the main unit 10 via the communication path 30, the power supply control on the operation unit 20 can be performed differently from (independently of) power control on the main unit 10.

In the exemplary first embodiment, the main unit 10 and the operation unit 20 are connected electrically and physically via the communication path 30; however, as described above, the operation unit 20 is detachable from the main unit 10. In this case, each of the main unit 10 and the operation unit 20 is provided with a short-distance wireless communication unit, such as an infrared communication unit, an RF communication unit, a Bluetooth (trademark) communication unit, where RF is an abbreviation of "radio frequency". Alternatively, each of the main unit 10 and the operation unit 20 may be provided with a wireless LAN communication function of, for example, Wi-Fi (trademark) to enable mutual communications via a wireless LAN access point (wireless LANAP) 41 and the network 40 as shown in FIG. 2, where LAN is an abbreviation of "local area network". When the operation unit 20 is detachable from the main unit 10, the operation unit 20 stores power supplied from the main unit 10 via the communication path 30 in a secondary battery and, when the operation unit 20 is detached from the main unit 10, operates by using the power stored in the secondary battery and communicates with the main unit 10.

Function of Operation Unit

Figure 3:
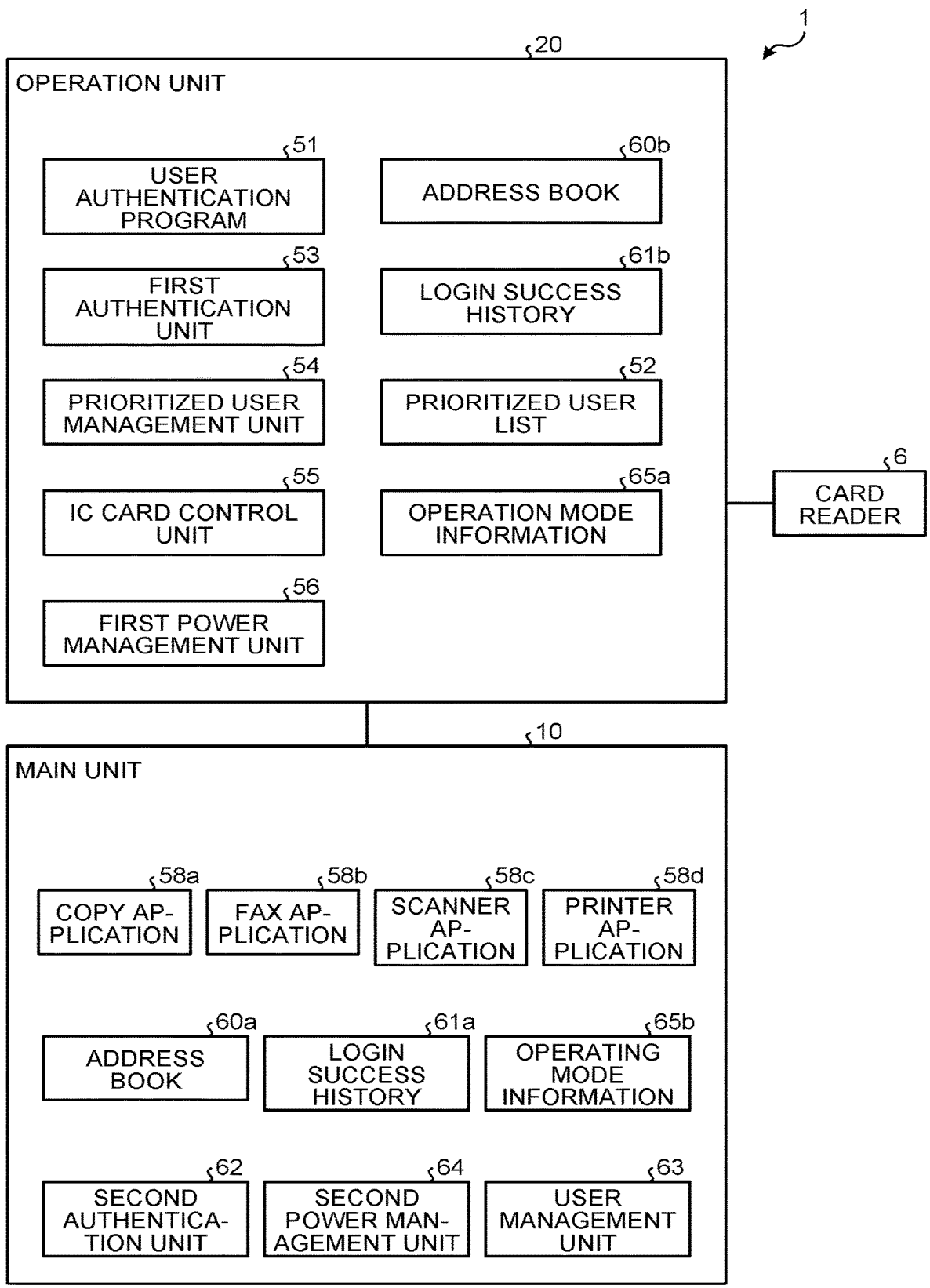
FIG. 3 is a functional block diagram of a main unit and an operation unit of the MFP of the first embodiment.

FIG. 3 shows a functional block diagram of the main unit 10 and the operation unit 20 of the MFP 1. According to FIG. 3, the operation unit 20 includes a first authentication unit 53, a prioritized user management unit 54, an IC card control unit 55, and a first power management unit 56. The CPU 21 shown in FIG. 1 executes at least one program that is installed in the operation unit 20 and accordingly each of these units operates. The operation unit 20 stores a user authentication program 51 that enables conduction control on each unit on a user authentication process and on user authentication. The operation unit 20 further stores an address book 60b, a login success history 61b, a prioritized user list 52 obtained by listing prioritized user information generated from the login success history 61b, and operating mode information 65a. These sets of information are stored in the ROM 22, the RAM 23, etc., shown in FIG. 1 (or may be stored in the flash memory 24 or in another storage device, such as a HDD (not shown in FIG. 1)). These sets of information may be stored in a storage device connectable to an auxiliary storage device of the operation unit 20 or the operation unit 20 via the network.

The first authentication unit 53 is an exemplary authentication unit. The first authentication unit 53 collates the card ID that is read from the IC card of the user on a login with the address book 60b stored in the operation unit 20. When the card ID is stored in the address book 60b, the first authentication unit 53 performs the user authentication process. When the card ID is not stored in the address book 60b, the first authentication unit 53 recognizes the IC card as an unregistered IC card that is used by the user on which user authentication has been performed and performs a process of registering the new IC card.

The prioritized user management unit 54 controls acquisition and update of an address book 60a and a login success history 61a from the main unit 10. The prioritized user management unit 54 controls generation and update of the prioritized user list 52. The IC card control unit 55 controls contactless wireless communications with the IC card via the IC card I/F 29.

Note that the user can manually register a user subjected to user authentication in the prioritized user list 52. When manually registering a user subjected to user authentication, the prioritized user management unit 54 stores the card ID, the user ID, and the password of the user subjected to authentication that is input by performing a manual operation in the address book 60a of the main unit 10. The prioritized user management unit 54 registers, in the prioritized user list 52 as the login success data information, the card ID, the user ID, and the input date of the user subjected to authentication, which is the user that is input by performing the manual operation.

The first power management unit 56 is an exemplary first power management unit. The first power management unit 56 reads the operating mode information 65a representing an operating mode that is previously set by, for example, a user and performs power supply control on the operation unit 20 on transition of the energy-saving mode and performs power supply control on the operation unit 20 on recovery of the energy-saving mode.

The exemplary first embodiment will be described in which it is assumed that the first authentication unit 53, the prioritized user management unit 54, the IC card control unit 55, and the first power management unit 56 are implemented as software according to the user authentication program 51. Part of or all the first authentication unit 53, the prioritized user management unit 54, the IC card control unit 55, and the first power management unit 56 may be implemented by using hardware, such as an integrated circuit (IC). In other words, those skilled in the art can carry out the present invention by using a device configured by connecting an application specific integrated circuit (ASIC) and a conventional circuit module. Each of the functions of the first embodiment can be implemented by using at least one processing circuit. Note that the "processing circuit" herein includes a processor that is programmed such that software implements each function and hardware, such as an ASIC and a circuit module that are designed to implement each function.

The user authentication program 51 may be provided by recording it in a file in an installable or executable form in a computer-readable recording medium, such a CD-ROM or a flexible disk (FD). Alternatively, the user authentication program 51 may be provided by recording it in a computer-readable recording medium, such as a CD-R, a DVD, a Blu-ray disc (trademark), or a semiconductor memory, where DVD is an abbreviation of "digital versatile disk". The user authentication program 51 may be provided in a way that it is installed via a network, such as the Internet. Alternatively, the user authentication program 51 may be provided by previously incorporating it in the ROM in the device.

Function of Main Unit

According to FIG. 3, in the main unit 10, various application programs including a copy application 58a, a FAX application 58b, a scanner application 58c, and a printer application 58d are stored. The copy application 58a is an application program for implementing the copy function by controlling a scanner engine and a plotter engine of the engine 17 shown in FIG. 1. The FAX application 58b is an application program for implementing the facsimile function by controlling a FAX modem 19 shown in FIG. 1.

The scanner application 58c is an application program for implementing the scanner function by controlling the scanner engine of the engine 17. The printer application 58d is an application program for printing a requested image or characters on paper sheet.

The CPU 11 of the main unit 10 functions as a second authentication unit 62, a user management unit 63, and a second power management unit 64 according to the user authentication program (not shown) of the main unit 10. The user management unit 63 controls write/read of the master information in/from the address book 60a in the HDD 14. The user management unit 63 controls write/read of login success history information in/from the login success history 61a. The user management unit 63 further controls transfer of the address book 60a and the login success history 61a to the operation unit 20. Basen on the master information that is stored in the address book 60a, the second authentication unit 62 performs the user authentication process on the user on which the operation unit 20 cannot perform user authentication.

The second power management unit 64 reads operating mode information 65b representing the operating mode that is previously set by, for example, the user and performs power supply control on the main unit on transition of energy-saving mode and performs power supply control on the main unit 10 on recovery of energy-saving mode.

The exemplary first embodiment will be further described in which it is assumed that the second authentication unit 62, the user management unit 63, and the second power management unit 64 are implemented as software according to the user authentication program of the main unit 10. Note that at least one of the second authentication unit 62, the user management unit 63, and the second power management unit 64 may be implemented by using hardware, such as an integrated circuit (IC), as described above.

The user authentication program of the main unit 10 may be provided by recording it in a file in an installable or executable form in a computer-readable recording medium, such as a CD-ROM or a flexible disk (FD). Alternatively, the user authentication program of the main unit 10 may be provided by recording it in a computer-readable recording medium, such as a CD-R, DVD, a Blu-ray disc (trademark), or a semiconductor memory, where DVD is an abbreviation of "digital versatile disk". Alternatively, the user authentication program of the main unit 10 may be provided by installing it via the network, such as the Internet. The user authentication program of the main unit 10 may be provided by incorporating it in, for example, the ROM of the device in advance.

User Authentication Operation

Figure 5:
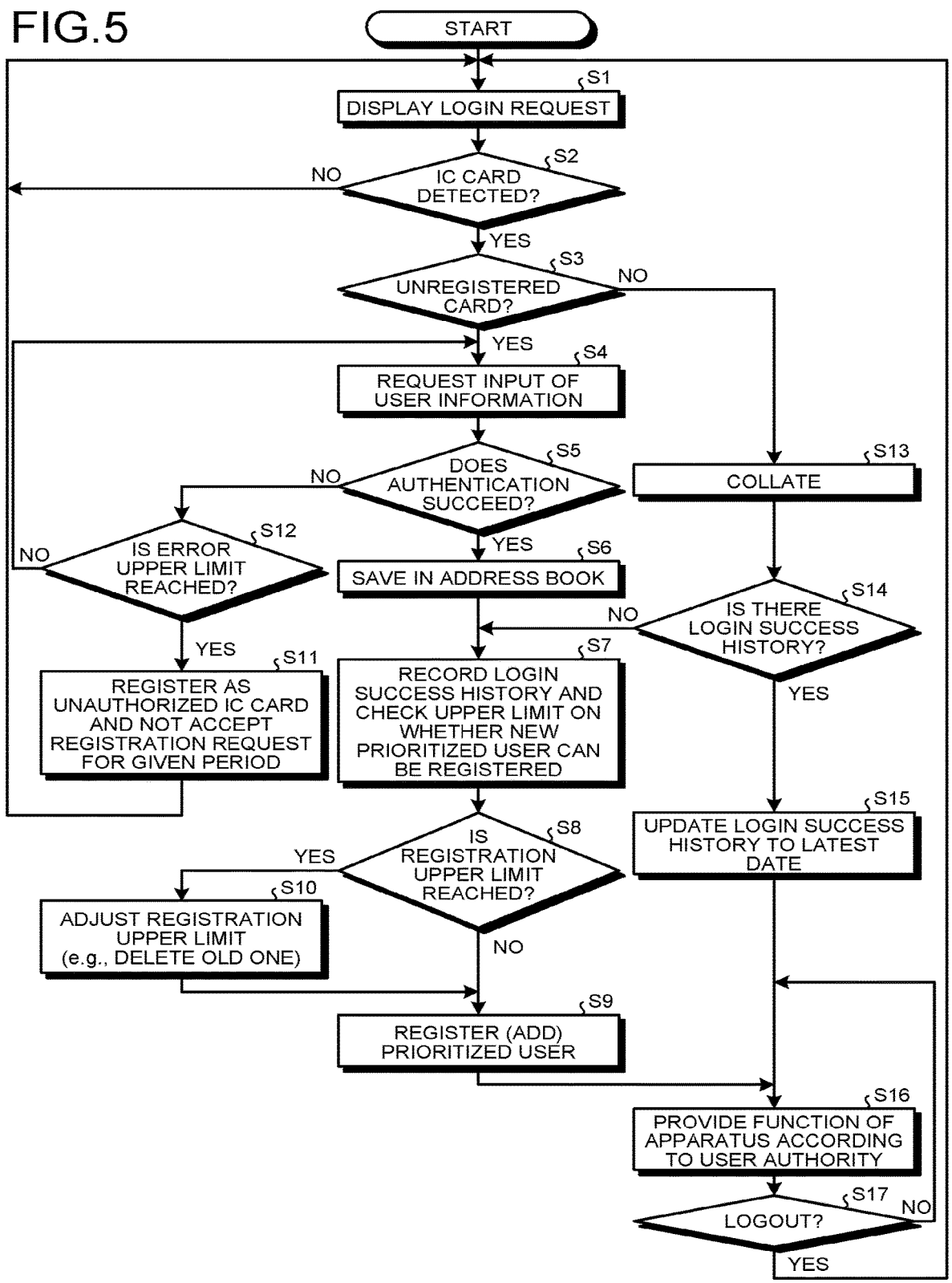
FIG. 5 is a flowchart showing the flow of a user authentication process performed by the MFP of the first embodiment.

A user authentication process performed by the MFP 1 of the first embodiment will be described with reference to the flowchart of FIG. 5. The user authentication process shown in the flowchart in FIG. 5 is performed on the premise that the prioritized user management unit 54 of the operation unit 20 acquires the address book 60a and the login success history 61a that are stored in, for example, the HDD 14 of the main unit 10 and stores them in, for example, the RAM 23 of the operation unit 20 when the MFP 1 is started (when the main power is turned on), just before transition to the energy-saving mode, or at given intervals. The address book 60b is a copy of the address book 60a that is stored in the main unit 10. Similarly, the login success history 61b is a copy of the login success history 61a that is stored in the main unit 10. The prioritized user management unit 54 acquires the login success history information on each of a given number of users starting from the user corresponding to the latest login date from the login success history 61b and stores the login success history information as information on the user subjected to authenticated in, for example, the prioritized user list 52 in the RAM 23. Accordingly, the user authentication process in the flowchart of FIG. 5 can be executed.

Figure 4:
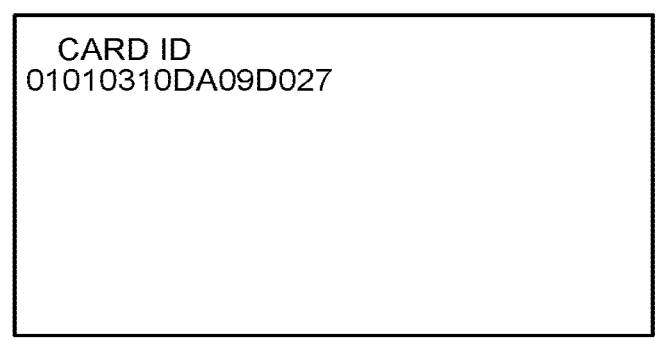

In the IC card 5, for example, as shown in FIG. 4, unique identification information (a card ID) is stored. FIG. 4 shows the example in which a card ID of "01010310DA09D027" is stored. When a contactless wireless communication with the IC card 5 is enabled, the IC card control unit 55 controls the card reader 6 such that the card reader 6 reads the card ID attached to the IC card 5.

In the exemplary first embodiment, the card ID is read from the IC card 5. For example, in the IC card 5, in addition to the card ID, another type of authentication information, such as the user ID, is stored. For this reason, the IC card control unit 55 may read the other type of authentication information, such as the user ID, in addition to the card ID and use it for user authentication, which will be described below.

The entire user authentication process will be described with reference to the flowchart of FIG. 5. At step S1 in the flowchart of FIG. 5, the operation unit 20 displays a message inducing an operation for logging in the MFP 1, such as "Log in", on the operation panel 27. The user who requires the use of the functions of the MFP 1 moves the IC card 5 of the user closer to the card reader 6. Accordingly, contactless wireless communications are started between the IC card 5 and the card reader 6.

At step S2, the IC card control unit 55 monitors whether a contactless wireless communication between the IC card 5 and the card reader 6 is started. Upon detecting that a contactless wireless communication between the IC card 5 and the card reader 6 is started, the IC card control unit 55 determines that the card reader 6 detects the IC card 5 (YES at step S2) and the process moves to step S3. The IC card control unit 55 continues displaying the message inducing a login operation at step S1 until the IC card control unit 55 detects the start of a contactless wireless communication between the IC card 5 and the card reader 6 (NO at step S2).

Once a contactless wireless communication with the IC card 5 is enabled, the IC card control unit 55 controls the card reader 6 such that it reads the card ID that has been described with reference to, for example, FIG. 4. Note that, as described above, another type of authentication information, such as the user ID, may be read in addition to the card ID.

At step S3, the first authentication unit 53 then collates the card ID, which is read, with each set of master information in the address book 60b that is copied in, for example, the RAM 23 of the operation unit 20. The first authentication unit 53 then determines whether the card ID, which is read, is registered in the address book 60b.

The fact that the card ID read from the IC card 5 is registered in the address book 60b means that the IC card 5 that is currently used by the user is the IC card 5 that is already registered in the address book 60a and the address book 60b. In this case, the first authentication unit 53 determines that the IC card 5 is not an unregistered card (is registered) (NO at step S3), and the process moves to step S13.

On the other hand, the fact that the card ID that is read from the IC card 5 is not registered in the address book 60b means that the IC card 5 that is currently used by the user is a new IC card that is not registered in the address book 60a and the address book 60b. In this case, the first authentication unit 53 determines that the IC card 5 is an unregistered card (is not registered) (YES at step S3), and the process moves to step S4.

The process from step S13 to step S17 in the flowchart of FIG. 5 shows the flow of the user authentication process. The process from step S4 to step S12 shows the flow of the process of registering a new IC card 5. When the card ID that is read from the IC card 5 is registered in the address book 60b, the user authentication process from step S13 to step S17 is executed. On the other hand, when the card IC that is read from the IC card 5 is not registered in the address book 60b, the process of registering a new IC card 5 from step S4 to step S12 is executed.

Process of Registering New IC Card

When the card ID that is read from the IC card 5 is not registered in the address book 60b and accordingly the process moves to the process of registering a new IC card 5, the first authentication unit 53 displays a screen for inputting the user ID and the password on, for example, the operation panel 27 at step S4. The first authentication unit 53 induces the user who uses the IC card 5 whose card ID is not registered to input the user ID and the password. The user operates the operation panel 27 to input the user ID and the password that were used to register another IC card 5.

In other words, the MFP 1 of the first embodiment is the MFP 1 that only authorized users are permitted to use. For this reason, if the user is an authorized user, master information containing the card ID, the user ID, and the password that were registered in the past should have been registered in the address book 60b (and the address book 60a). When an authorized user uses a new IC card 5, the card ID that is read from the IC card 5 is a card ID that is not registered in the address book 60b. For this reason, when the card ID that is read from the IC card 5 is not registered in the address book 60b, the first authentication unit 53 requires the user to input the user ID and the password at step S4.

The first authentication unit 53 then collates the user ID and the password that are input by the user with the master information on each user in the address book 60b. The fact that the user ID and the password that are input by the user are registered in the address book 60b means that the user is an authorized user who performed user registration with a different IC card 5 in the past. In this case, the first authentication unit 53 determines that authentication succeeds at step S5 (YES at step S5) and the process moves to step S6.

On the other hand, the fact that the user ID and the password that are input by the user are not registered in the address book 60b implies that the user is highly likely an unauthorized user, while it is also assumed that the user ID or (and) the password were input incorrectly. In this case, the first authentication unit 53 determines that authentication fails (NO at step S5) and the process moves to step S12 where the user is required to input the user ID and the password again. The user then re-inputs the user ID and the password.

Each time the user re-inputs the user ID and the password, the first authentication unit 53 collates them with the address book 60b to determine whether authentication succeeds or fails. The first authentication unit 53 counts errors in inputting the user ID and the password. Upon counting an input error for a given number of times, for example, for three times (the upper limit of failure is reached: YES at step S12), the process moves to step S11. At step S11, the first authentication unit 53 registers the card ID as a card ID of an unauthorized IC card 5 in the RAM 23 and transfers the card ID to the user management unit 63 of the main unit 10. The user management unit 63 of the main unit 10 registers the transferred card ID as a card ID of an unauthorized IC card 5 in, for example, the HDD 14 of the main unit 10.

On the other hand, the fact that the user ID and the password that are input by the user are registered in the address book 60b means that the user who input the user ID and the password is an authorized user and the IC card 5 currently used is a new IC card (unregistered IC card) 5. In this case, the process moves to step S6 where the prioritized user management unit 54 registers, in the address book 60b, new master information in which the card ID of the new IC card 5 and the user ID and the password that are input by the user are associated with one another, and the process moves to step S7. The prioritized user management unit 54 transfers the new master information to the user management unit 63 of the main unit 10. The user management unit 63 of the main unit 10 registers the new master information in the address book 60a.

At step S7, the user management unit 63 generates login success history information in which the card ID of the new IC card 5, the user ID that is input from the user, and the login success date information representing the current date are associated with one another and registers the login success history information in the login success history 61b as login success history information on the latest date. The user management unit 63 also transfers the login success history information on the latest date to the user management unit 63 of the main unit 10. The user management unit 63 registers the transferred login success history information on the latest date in the login success history 61a.

In the login success history 61b, sets of login success history information in each of which a user ID and a card ID are associated with each other are registered according to the descending order of login success dates. Among the sets of login success history information that are registered in the login success history 61b, sets of login success history information on a pre-determined number of users are registered in, for example, the RAM 23 of the operation unit 20 as the prioritized user list 52.

Specifically, the prioritized user list 52 defines the number of users that can be registered, for example, 300. The login success history information on 300 users counted from the user corresponding to the latest login date is read from the login success history 61b and the login success history information is registered in the prioritized user list 52, for example, when the MFP 1 is started (when the main power is turned on), just before transition to the energy-saving mode, or at given intervals. When the number of users on which login success history information is currently registered in the login success history 61b is smaller than a possible upper limit of registration, the login success history information on 150 users currently registered in the login success history 61b is registered in the prioritized user list 52.

The possible upper limit of registration in the prioritized user list 52 is determined as described above. When new login success history information is registered in the login success history 61b, the prioritized user list 52 has to be simultaneously updated to one containing the new login success history information. For this reason, the prioritized user management unit 54 determines whether the number of sets of login success history information registered in the prioritized user list 52 reaches the upper limit (300) at step S7. When it is determined that the number of sets of login success history information registered in the prioritized user list 52 does not reach the upper limit (NO at step S8), the process moves to step S9.

When it is determined that the number of sets of login success history information registered in the prioritized user list 52 reaches the upper limit (YES at step S8), the process moves to step S10. At step S10, the prioritized user management unit 54 deletes, for example, the set of login success history information on the oldest login success date from the prioritized user list 52, and the process moves to step S9.

According to the exemplary first embodiment, when it is determined that the number of sets of login success history information registered in the prioritized user list 52 reaches the upper limit, the set of login success history information on the oldest login success date is deleted from the prioritized user list 52. Then the new login success history information is registered in the prioritized user list 52.

When it is determined that the number of sets of login success history information registered in the prioritized user list 52 reaches the upper limit, multiple sets of login success history information on, for example, 10 users counted from the set of login success history information on the oldest login success date may be deleted. Thereafter, until the number of sets of registered login success history information reaches the upper limit, new login success history information may be registered in the prioritized user list 52.

In addition to the card ID, the user ID, and the login success history, login frequency (frequency at which the MFP 1 is used), the group to which the user belongs, and the job title of the user may be registered in the prioritized user list 52 to automatically choose subjects to be deleted according to those types of registered information.

The upper limit of possible registration in the prioritized user list 52 may be automatically or manually added, for example, from 300 to 310.

The prioritized user list 52 may be stored in a storage medium, such as a semiconductor memory card or a magnetic card, such that the prioritized user list 52 is transferrable to an apparatus, such as a another MFP 1.

Then, at step S9, the prioritized user management unit 54 registers the new login success history information, which is registered in the login success history 61b, in the prioritized user list 52 as the latest login success history information.

Thereafter, the process moves to step S16 where the CPU 11 of the main unit 10 controls the engine 17 to cause the CPU 11 of the main unit 10 to provide a function corresponding to the user authority. At step S16, the CPU 11 of the main unit 10 provides a given function until a logout operation performed by the user or timeout is detected at step S17 (NO at step S17).

User Authentication Process

Then, when the card ID that is read from the IC card 5 is registered in the address book 60*b*, the process moves to the user authentication process from step S13 to step S17. At step S13, the first authentication unit 53 collates the card ID that is read from the IC card 5 with the prioritized user list 52. At step S14, the first authentication unit 53 determines whether the login success history information corresponding to the card ID is registered in the prioritized user list 52. The prioritized user list is a user list of users who succeeded in login recently (within, for example, one hour or two days).

When the login success history information corresponding to the card ID cannot be detected from the prioritized user list 52 (NO at step S14), the process moves to step S7. At step S7, the prioritized user management unit 54 generates new login success history information by associating the card ID that is read from the IC card 5, the user ID corresponding to the card ID, and the login success date information representing the current date with one another and registers the new login success history information in the login success history 61*b*. Furthermore, the prioritized user management unit 54 transfers the generated new login success history information to the user management unit 63 of the main unit 10. The user management unit 63 of the main unit 10 updates the login success history 61*a* stored in, for example, the HDD 14 of the main unit 10 according to the transferred new login success history information.

Furthermore, the prioritized user management unit 54 determines, at step S7 and step S8, whether the number of sets of login success history information registered in the prioritized user list 52 reaches the upper limit. When the number of sets of login success history information reaches the upper limit, the prioritized user management unit 54 deletes a given number of sets of login success history information at step S10. The prioritized user management unit 54 then registers new login success history information in the prioritized user list 52 at step S9.

Thereafter, the process moves to step S16 where the CPU 11 of the main unit 10 controls the engine 17 to cause the CPU 11 of the main unit 10 to provide a function corresponding to the user authority. The CPU 11 of the main unit 10 provides a given function until a logout operation performed by the user or timeout is detected at step S17 (NO at step S17).

On the other hand, when, at step S14, the login success history information corresponding to the card ID is detected in the prioritized user list 52 (YES at step S14), the process moves to step S15. At step S15, the prioritized user management unit 54 updates the login success date information in the login success history information corresponding to the card ID, which is information that is detected from the prioritized user list 52, to the current date.

Accordingly, the login success history information on the IC card that is currently used by the user is registered in the prioritized user list 52 as the latest login success history information. Once the prioritized user management unit 54 performs the process of updating the prioritized user list 52, the prioritized user management unit 54 updates the login success history 61*b* according to the latest login success history information and transfers the latest login success history information to the user management unit 63 of the main unit 10. The user management unit 63 updates the login success history 61*a* that is stored in, for example, the HDD 14 of the main unit 10 according to the transferred latest login success history information.

Then, when the prioritized user list 52 is updated, the process moves to step S16 where the engine 17 is controlled such that the CPU 11 of the main unit 10 provides a function corresponding to the user authority. The CPU 11 of the main unit 10 provides a given function at step S16 until when a logout operation performed by the user or timeout is detected at step S17 (NO at step S17).

Power Supply Control

When the card reader 6 is connected to the main unit of the MFP 1 and is driven, power supply to the card reader 6 is turned on/off according to the energy-saving mode of the main unit and an inconvenience occurs in that the energy-saving mode of the operation unit transitions. For this reason, when the main unit transitions to the energy-saving mode, it is necessary to maintain the energy-saving mode of the main unit at a "silent state (silent mode)" or higher in order for login using the IC card. In the silent mode, the engine of the main unit is kept driven, which causes an inconvenience in that the life of the engine shortens.

For this reason, in the MFP 1 of the first embodiment, the main unit 10 and the operation unit 20 are physically different devices and the card reader 6 is connected to the operation unit 20 that is separated from the main unit 10. Furthermore, it is determined whether it is possible to perform a login with an IC card 5 in the energy-saving mode according to transition not of the energy-saving mode of the main unit 10 but of the energy-saving mode of the operation unit 20.

Figure 6:
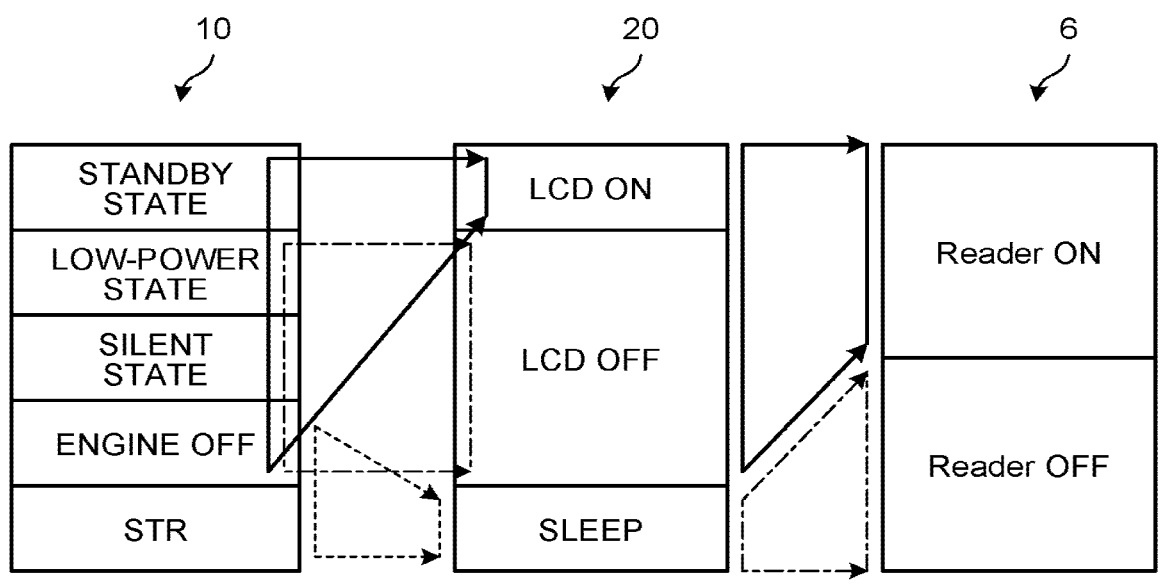
FIG. 6 is a diagram illustrating each operating mode of the MFP of the first embodiment.

FIG. 6 shows energy-saving modes of the main unit 10, energy-saving modes of the operation unit 20, and operating modes of the card reader 6. An energy-saving mode is a mode where power consumption is reduced by stopping power supply to a given hardware resource. The main unit 10 and the operation unit 20 have multiple energy-saving modes.

For example, the main unit 10 has, as the energy-saving modes, a "standby mode (standby state)", a "low-power mode (low-power state)", a "silent mode (silent state)", an "engine-off mode (engine-off)", and a "suspend to RAM (STR) mode". The power consumption in the "standby mode (standby state)" is the highest and power consumption in the SIR mode is the lowest. In the SIR mode, the current state is saved in the memory (RAM 13) and power supply to most devices, such as the CPU 11 and the HDD 14, is stopped.

For example, the operation unit 20 has, as the energy-saving modes, a "LCD-on mode (LCD ON)" in which the LCD of the operation panel 27 is kept on, a "LCD-off mode (LCD OFF)" in which the LCD of the operation panel 27 is kept off, and a "sleep mode (SLEEP)" in which the LCD is kept off and conduction through most hardware resources is stopped.

Furthermore, the card reader 6 has a "reader-on mode (Reader ON)" in which conduction is kept and a "reader-off mode (Reader OFF)" in which power is kept stopped. In the reader-on mode, it is possible to perform contactless wireless communications with the IC card 5. On the other hand, in the reader-off mode, it is impossible to perform contactless wireless communications with the IC card 5.

The operation panel 27 of the operation unit 20 is in the LCD-on mode or the LCD-off mode, the first power management unit 56 of the operation unit 20 supplies power to the card reader 6. Accordingly, the card reader 6 enters the reader-on mode where the card reader 6 is kept driven, which makes it possible to perform a login operation with the IC card 5. On the other hand, when the operation unit 20 enters the sleep mode, the first power management unit 56 of the operation unit 20 stops power supply to the card reader 6. In this case, contactless wireless communications with the IC card 5 cannot be performed and accordingly it is impossible to perform a login operation using the IC card 5.

When it is impossible to perform the login operation, it is possible to recover the operation unit 20 to the LCD-on mode by performing an operation of touching the operation unit 20 or an operation of, for example, setting an original on the main unit 10.

Even when the main unit 10 enters the engine-off mode, power is supplied from the operation unit 20 to the card reader 6 by keeping the energy-saving mode of the operation unit 20 not transitioning to the LCD-off mode or lower (not transitioning to the sleep mode), which maintains the reader-on mode of the card reader 6. Accordingly, it is possible to perform a login operation with the IC card 5.

In the MFP 1 of the first embodiment, conditions for recovering from the energy-saving mode with the IC card 5 can be set finely. In other words, assume that the card reader 6 is connected to the main unit 10 of the MFP 1 and the address book 60a of the main unit 10 or the authentication server device that is connected to the main unit 10 via the network is used to perform the user authentication process. In this case, in order to perform the login operation with the IC card 5 in an energy-saving mode, for example, it is necessary to start the HDD 14 in which the address book 60a of the main unit 10 is saved or communicate with the authentication server device on the network 40.

For this reason, the MFP 1 of the first embodiment connects the card reader 6 not to the main unit 10 but to the operation unit 20. Then the user authentication process is performed only by the operation unit 20 by using the address book 60b that is previously cached from the main unit 10 in the operation unit 20. Accordingly, without recovering the main unit 10 from the energy saving mode, user authentication can be performed with the IC card 5. In other words, without depending on the main unit 10, the user authentication process can be performed by only the operation unit 20.

When the card reader 6 is connected to the main unit 10 of the MFP 1 and the main unit 10 transitions to an energy-saving mode, power is not supplied to the card reader 6, which makes it difficult to perform a contactless wireless communication with the IC card 5. This problem is likely to be solved by keeping the energy-saving mode of the main unit transitioning to only energy saving modes in which power supply can be supplied to the card reader 6 and by enabling power supply to the card reader 6 for, for example, 10 hours at maximum. After 10 hours, however, power is not supplied to the card reader 6, which makes it difficult to recover the main unit 10 from the energy saving mode with the IC card 5. In this case, it is necessary to recovery the main unit 10 from the energy-saving mode by performing a touch operation on the operation unit or setting an original on the main unit.

For this reason, in the MFP 1 of the first embodiment, it is possible to connect the card reader 6 to the operation unit 20 and set conditions for transition of the energy-saving mode differently between the operation unit 20 and the main unit 10. This allows user authentication with the IC card 5 without recovering the main unit 10 from the energy-saving mode. In other words, without depending on the main unit 10, the user authentication process can be performed by only the operation unit 20.

In the MFP 1 of the first embodiment, while the main unit 10 is caused to transition to the energy saving mode at the lowest power consumption, the operation unit 20 is only allowed to transition to energy saving modes in which the card reader 6 can be kept supplied with power. Furthermore, in the MFP 1 of the first embodiment, the main unit 10 is kept in the standby mode without turning power off to enable all the functions at any time and the operation unit 20 is kept in the sleep mode.

Figure 7:
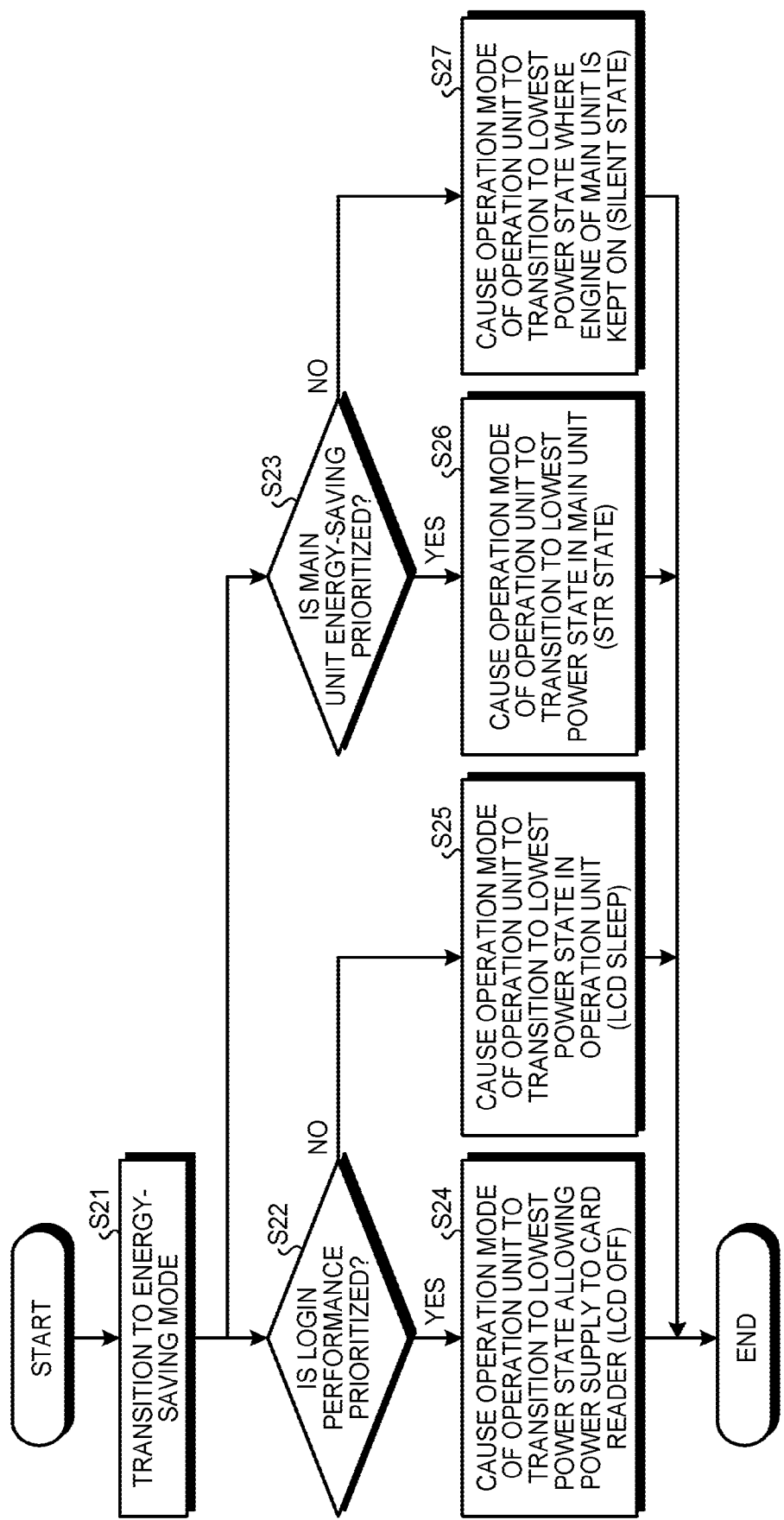
FIG. 7 is a flowchart of an operation for transition to an energy-saving mode in the MFP of the first embodiment.

The flowchart of FIG. 7 shows the flow of operations performed by the main unit 10 and the operation unit 20 to transition to given energy-saving modes. The flowchart starts when a given time, such as five minutes, elapses after the main unit 10 and the operation unit 20 enter the non-operation state or the non-communication state, and the process is executed from step S21.

At step S21, the CPU 11 of the main unit 10 and the CPU 21 of the operation unit 20 communicate with each other to start the operation of transitioning to energy-saving modes. According to the user authentication program 51 that is stored in the ROM 22, the CPU 21 of the operation unit 20 functions as the first power management unit 56 and refers to the operating mode information 65a that is stored in the RAM 23.

The operating mode information 65a and the operating mode information 65b of the main unit 10 to be described below are set by default, or are chosen by the user and set, and are stored in the RAM 23 and the HDD 14. The first power management unit 56 refers to the operating mode information 65a that is stored in the RAM 23 to determine whether a login performance prioritized mode is set.

The login performance prioritized mode is a mode in which the operating mode of the operation unit 20 is maintained at an energy-saving mode in which the card reader 6 connected to the operation unit 20 is able to read the authentication information of the IC card 5. When it is determined at step S22 that the login performance prioritized mode is set (YES at step S22), the process moves to step S24. When it is determined that the login performance prioritized mode is not set (NO at step S22), the process moves to step S25.

At step S24 corresponding to the first process, because the login performance prioritized mode is set, the first power management unit 56 causes transition of the operating mode of the operation unit 20 to the lowest energy-saving mode enabling power supply to the card reader 6, and the process of the flowchart of FIG. 7 ends.

The lowest energy-saving mode enabling power supply to the card reader 6 is the LCD-off mode as shown in FIG. 6 in the first embodiment. In the LCD-off mode, while power consumption increases, it is possible to shorten the time from when the IC card 5 is held against the card reader 6 in the energy-saving mode to when the login operation completes.

On the other hand, at step S25 corresponding to a second process, the login performance prioritized mode is not set, the first power management unit 56 causes transition of the operating mode of the operation unit 20 to the energy-saving mode in which power consumption is the lowest, and the process of the flowchart of FIG. 7 ends.

In the energy-saving mode in which power consumption is the lowest is the sleep mode in the first embodiment as shown in FIG. 6. While the sleep mode requires a time to complete a login operation by holding the IC card 5 against the card reader 6 in the energy-saving mode, it significantly reduces power consumption.

On the other hand, when the operation for transition to an energy-saving mode is started in the main unit 10, the CPU 11 functions as the second power management unit 64 according to the user authentication program. At step S23, the second power management unit 64 refers to the operating mode information 65b that is stored in the HDD 14 to determine whether a main unit energy-saving prioritized mode is set.

The main unit energy-saving prioritized mode is an operating mode of the main unit 10 in which conduction through most hardware resources of the main unit 10 is stopped to reduce power consumption. When it is determined at step S23 that the main unit energy-saving prioritized mode is set (YES at step S23), the process moves to step S26. When it is determined at step S23 that the main unit energy-saving prioritized mode is not set (NO at step S23), the process moves to step S27.

At step S26 corresponding to a fourth process, because the main unit energy-saving prioritized mode is set, the second power management unit 64 cause transition of the operating mode of the main unit 10 to the lowest energy-saving mode, and the process of the flowchart of FIG. 7 ends. In the first embodiment, the lowest energy-saving mode is the STR mode as shown in FIG. 6. While the STR mode requires a time to recover the functions of the main unit 10, it significantly reduces power consumption.

On the other hand, at step S27 corresponding to a third process, because the main unit energy-saving prioritized mode is not set, the second power management unit 64 causes transition of the operating mode of the main unit 10 to the lowest energy-saving mode in which the engine 17 of the main unit 10 is kept at the on state, and the process of the flowchart of FIG. 7 ends.

In the first embodiment, the lowest energy-saving mode in which the engine 17 is kept at the on state is the silent mode as shown in FIG. 6. In the silent mode, while power consumption increases slightly, the engine 17 is kept driven and therefore the functions can be used any time.

Figure 8:
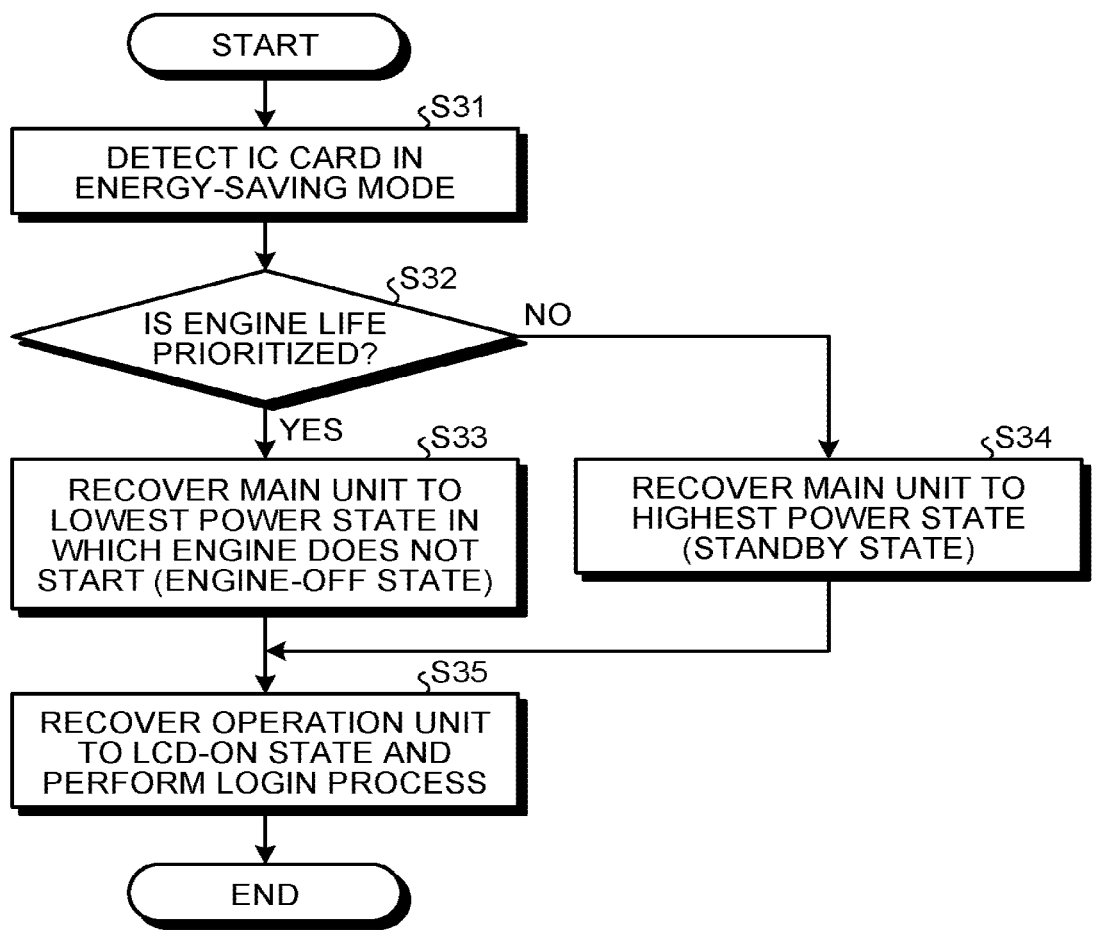
FIG. 8 is a flowchart of an operation for recovery from the energy-saving mode in the MFP of the first embodiment.

With reference to the flowchart of FIG. 8, an operation of recovering the main unit 10 and the operation unit 20 from the energy-saving mode will be described. The flowchart of FIG. 8 starts when the operation unit 20 transitions to the LCD-off mode that is the operating mode in which power is supplied to the card reader 6 in the state where the LCD of the operation panel 27 is off, and the process is sequentially performed from step S31.

In the LCD-off mode, power is supplied from the operation unit 20 to the card reader 6. For this reason, the card reader 6 is able to perform a contactless wireless communication at any time with the IC card 5. Once a contactless wireless communication is started between the card reader 6 and the IC card 5, the first power management unit 56 of the operation unit 20 starts an operation of recovery from the energy-saving mode and the process moves to step S32.

At step S32, the first power management unit 56 refers to the operating mode information 65a that is stored in the RAM 23 to determine whether the engine life prioritized mode is set. The engine life prioritized mode is an operating mode in which the engine 17 for the scanner function, the printing function, the FAX function, etc., of the main unit 10 is not started and only the operation unit 20 is recovered from the energy-saving mode to enable, for example, the use of cloud services by performing operations on the screen. When the engine life prioritized mode is set (YES at step S32), the process moves to step S33. When the engine life prioritized mode is not set (NO at step S32), the process moves to step S34.

When it is determined that the engine life prioritized mode is set and accordingly the process moves to step S33 corresponding to a sixth process, the first power management unit 56 transmits information representing that the engine life prioritized mode is set to notify the second power management unit 64 of the main unit 10 of the fact. At step S33, according to the notification, the second power management unit 64 of the main unit 10 recovers the operating mode of the main unit 10 to the lowest energy-saving mode in which the engine 17 is not started. Then the process moves to step S35. In the first embodiment, the lowest energy-saving mode in which the engine 17 is not driven is the engine-off mode as shown in FIG. 6.

On the other hand, when it is determined that the engine life prioritized mode is not set and accordingly the process moves to step S34 corresponding to a fifth process, the first power management unit 56 transmits information representing that the engine life prioritized mode is not set to notify the second power management unit 64 of the main unit 10 of the fact. At step S34, according to the notification, the second power management unit 64 of the main unit 10 causes conduction through the engine 17, etc., and recovers the operating mode of the main unit 10 to the standby mode that is the energy-saving mode in which power consumption is the highest. Then the process moves to step S35.

At step S35, the first power management unit 56 of the operation unit 20 recovers the operating mode of the operation unit 20 to the LCD-on mode. Accordingly, when the engine life prioritized mode is set, in the state where the operating mode of the main unit 10 is kept in the engine-off mode in which the engine 17 is not driven, only the operation unit 20 is driven, which makes it possible to acquire the authentication information from the IC card 5 via the card reader 6. The first authentication unit 53 performs the above-described user authentication process by using the authentication information that is acquired from the IC card 5.

Effect of First Embodiment

As is clear from the above descriptions, in the MFP 1 of the first embodiment, it is possible to perform the user authentication process by starting only the operation unit 20 without starting the main unit 10. This increases the life of the engine 17 of the main unit 10.

Second Embodiment

An authentication system 92 according to a second embodiment of the present invention will be described here. In the authentication system 92 of the second embodiment, an authentication server device that is provided on a network performs the above-described user authentication process.

Hardware Configuration of Authentication System of Second Embodiment

Figure 9:
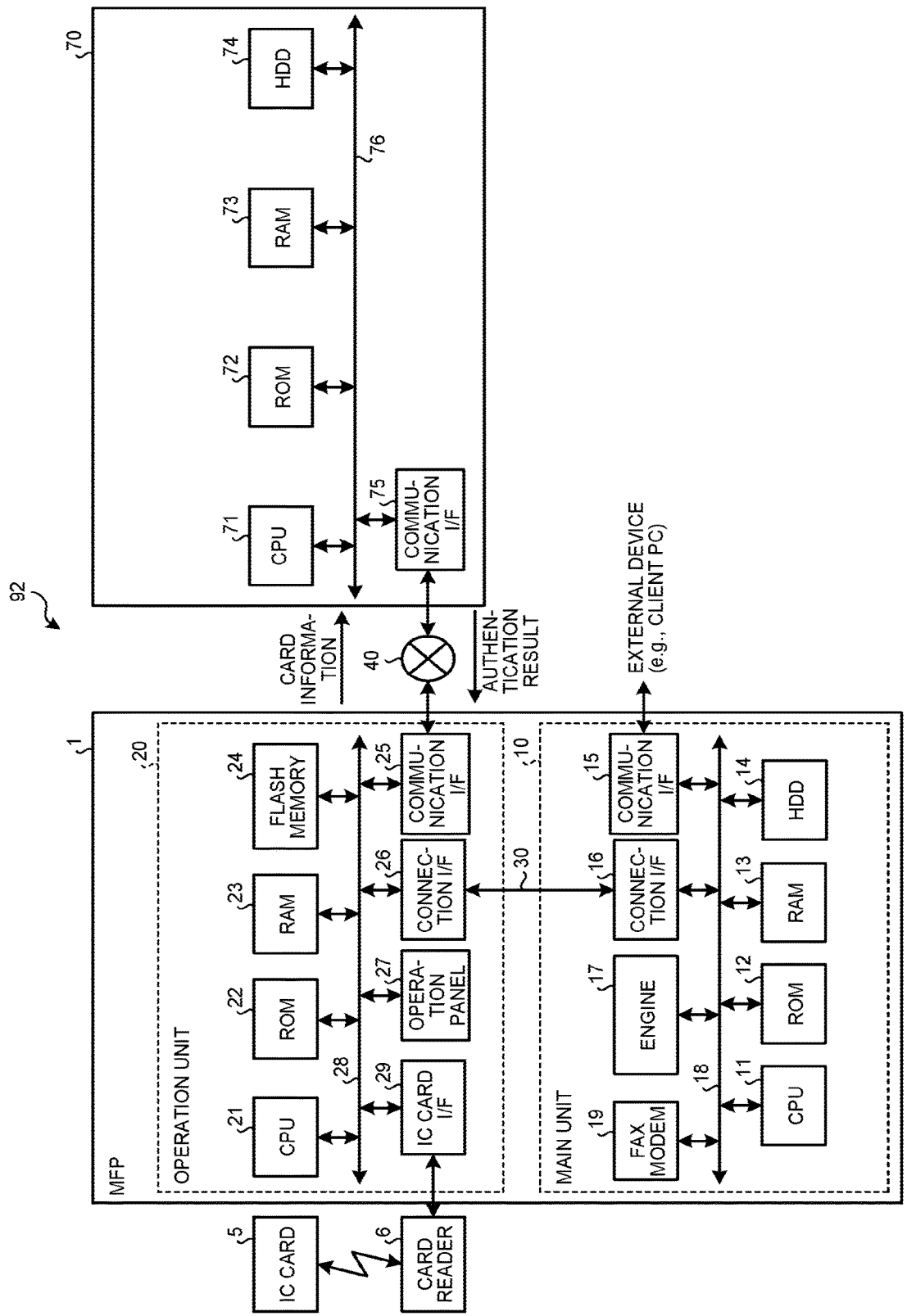
FIG. 9 is a hardware configuration diagram of an authentication system of a second embodiment of the present invention.

FIG. 9 shows a hardware configuration of the authentication system 92 according to the second embodiment. In FIG. 9, components performing the same operations as those of the first embodiment are denoted with the same reference numerals as those of the first embodiment. For the details of the operations, the descriptions of the first embodiment can be referred to. As shown in FIG. 9, in the authentication system 92 of the second embodiment, the communication I/F 25 of the operation unit 20 of the MFP 1 is connected to the network 40, such as the Internet, and a communication I/F 75 of an authentication server device 70 is connected to the network 40. Accordingly, the MFP 1 and the authentication server device 70 are connected with each other via the network 40, which configures the authentication system 92 of the second embodiment.

The authentication server device 70 is formed by connecting a CPU 71, a ROM 72, a RAM 73, a HDD 74, and the communication I/F 75 with one another via a system bus 76.

The CPU 71 controls overall operations of the authentication server device 70. The CPU 71 uses the RAM 73 as a work area and executes a program that is stored in, for example, the ROM 72 to control overall operations of the authentication server device 70. The CPU 71 further executes the user authentication program that is stored in, for example, the ROM 72 to implement the user authentication operation that is described with respect to the first embodiment. The communication I/F 75 is an interface for communicating with the MFP 1 on the network 40.

In the RAM 73 (or another storage unit, such as a flash memory), the address book 60b and the login success history 61b that are previously transmitted from the operation unit 20 of the MFP 1 are stored. The CPU 71 stores sets of login success history information on a given number of users from the latest login success history information as the prioritized user list 52 in the RAM 73.

Figure 10:
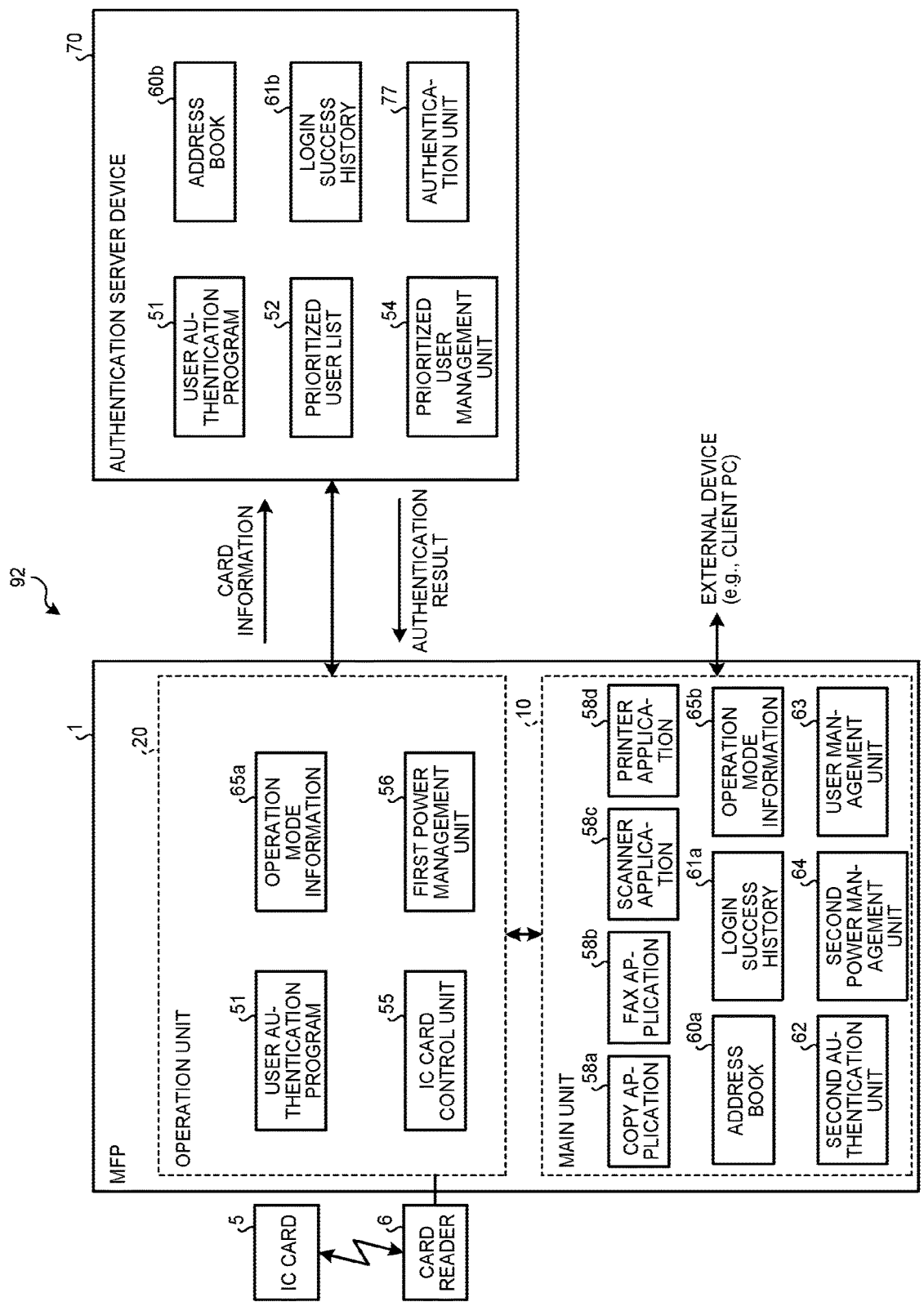
FIG. 10 is a functional block diagram of the authentication system of the second embodiment.

Function of Authentication System according to Second Embodiment FIG. 10 shows a functional block diagram of the authentication system 92 of the second embodiment. According to FIG. 10, the authentication server device 70 includes the units of the prioritized user management unit 54 including an authentication unit 77 and the prioritized user management unit 54. The CPU 71 shown in FIG. 9 executes at least one program that is installed in the authentication server device 70 and accordingly each of the units operates. The authentication server device 70 stores the user authentication program 51 for performing the above-described user authentication process in the ROM 72 shown in FIG. 9. Furthermore, the authentication server device 70 stores the address book 60b and the login success history 61b that are transferred from the main unit 10 via the operation unit 20 and the prioritized user list 52 obtained by listing the prioritized user information that is generated from the login success history 61b. These types of information are stored in, for example, the ROM 72 and the RAM 73 shown in FIG. 9 (or another storage device, such as the HDD 74 or a flash memory (not shown in FIG. 9)).

The CPU 71 of the authentication server device 70 operates according to the user authentication program 51 to function as the prioritized user management unit 54 and function as the authentication unit 77 corresponding to the first authentication unit 53 (FIG. 3) described with respect to the first embodiment.

Operation of Authentication System of Second Embodiment

In the authentication system 92, the operation unit 20 of the MFP 1 transmits the address book 60a that is stored in the main unit 10 as master information on each user to the authentication server device 70 in advance. The authentication server device 70 stores the transmitted address book 60a in, for example, the RAM 73 as the address book 60b. Furthermore, on a login operation, the operation unit 20 of the MFP 1 transmits the card ID that is read from the IC card 5 of the user to the authentication server device 70 via the IC card I/F 29 according to the action of the IC card control unit 55. The authentication unit 77 of the authentication server device 70 performs user authentication by collating the card ID, which is transmitted from the MFP 1, with the address book 60b, which is stored in the authentication server device 70. The CPU 71 generates login success history information in which the user ID who succeeded in user authentication, the card ID, and the login success date information are associated with one another and stores the login success history information in, for example, the RAM 73 as the login success history 61b. Furthermore, the authentication unit 77 of the authentication server device 70 stores sets of login success history information on the given number of users from the set of login success history information on the latest login success date in, for example, the RAM 73 as the prioritized user list 52. This enables the above-described user authentication process.

In other words, the operation unit 20 of the MFP 1 transmits the card ID that is read by the IC card I/F 29 on a login operation to the authentication server device 70. The authentication unit 77 of the authentication server device 70 collates the card ID that is transmitted from the MFP 1 with the prioritized user list 52. When the card ID transmitted from the MFP 1 is in any one of sets of login success history information in the prioritized user list 52, the authentication unit 77 authenticates the user of the card ID, which is transmitted from the MFP 1, as an authorized user. The authentication result is then transmitted to the operation unit 20 of the MFP 1 via the network 40. When the CPU 21 of the operation unit 20 obtains the authentication result representing that the user is an authorized user, the CPU 21 of the operation unit 20 communicates with the CPU 11 of the main unit 10 to enable the use of the MFP 1.

Effect of Second Embodiment

In the authentication system 92 of the second embodiment, because the authentication server device 70 performs the user authentication process, the load of the MFP 1 can be reduced and the same effect as that from the first embodiment can be obtained.

Third Embodiment

An authentication system 94 of a third embodiment of the invention will be described. In the authentication system 94 of the third embodiment, multiple authentication server devices are provided on a network and the authentication server devices share in performing the above-described user authentication process.

Configuration of Authentication System According to Third Embodiment

Figure 11:
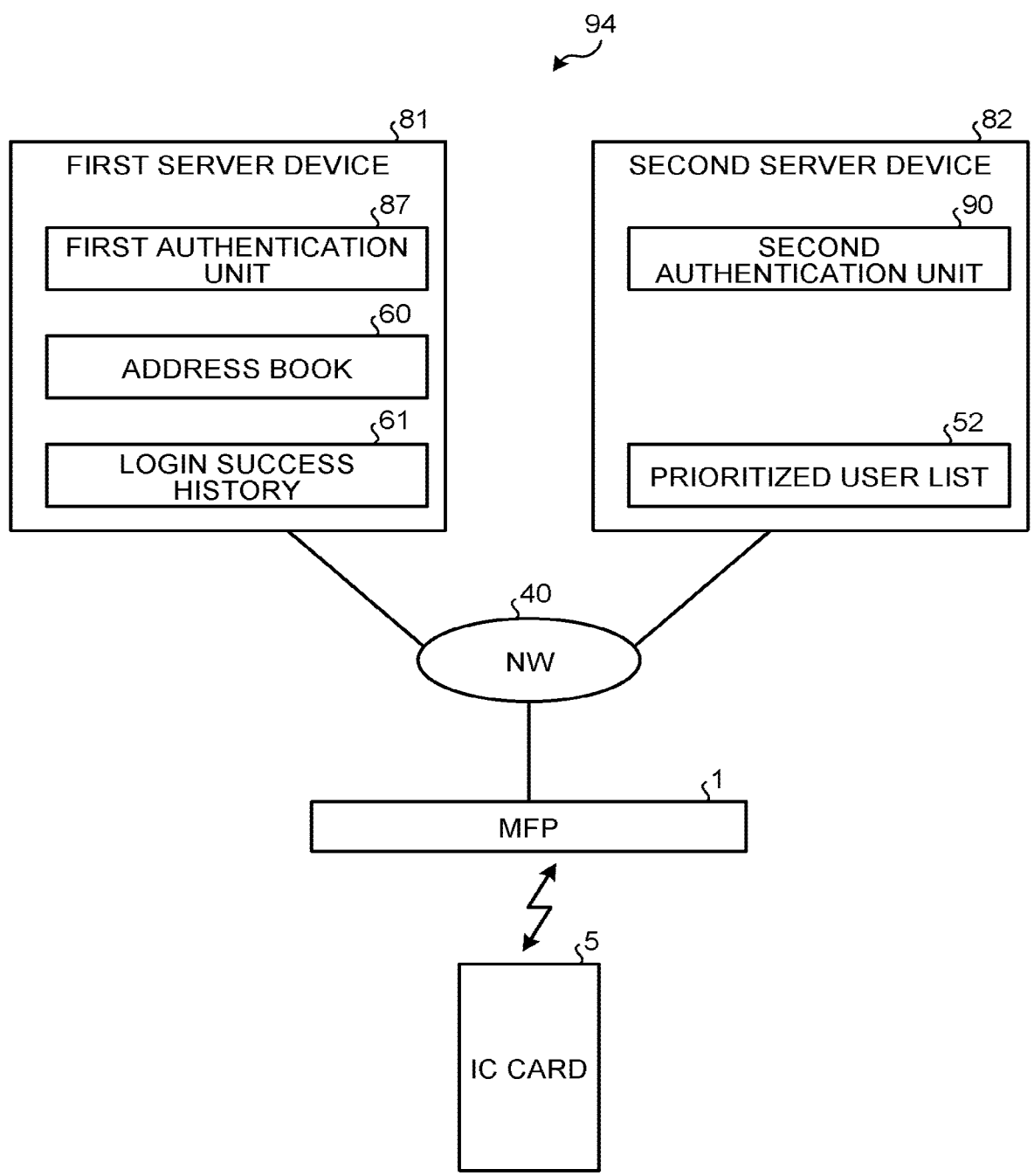
FIG. 11 is a system configuration diagram of an authentication system of a third embodiment of the present invention.

FIG. 11 shows a system configuration of the authentication system 94 of the third embodiment. In FIG. 11, the components performing the same operations as those of the first embodiment are denoted with the same reference numerals as those of the first embodiment. For the details of the operations, the descriptions of the first embodiment can be referred to. As shown in FIG. 11, the authentication system 94 of the third embodiment is configured by connecting a first server device 81 that performs a process of registering a new IC card, a second server device 82 that performs user authentication, and the MFP 1 with one another via the network 40.

The first server device 81 that performs the process of registering a new IC card is an exemplary first server device. The second server device 82 that performs user authentication is exemplary second server device. The MFP 1 has the configuration that is described above with reference to FIG. 1 and includes the CPU 11 and the engine 17. The MFP 1 further includes the prioritized user management unit 54 and the IC card control unit 55 as described with reference to FIG. 3. As described with reference to FIG. 1, the MFP 1 includes the communication I/F 25 and the RAM 23.

The first server device 81 is a server device that performs the process of registering a new IC card that corresponds to the process from step S4 to step S12 in the flowchart of FIG. 5. The first server device 81 includes a first authentication unit 87 that is a function implemented by the CPU by executing the user authentication program. The first authentication unit 87 stores the address book 60 transmitted from the MFP 1 in the first server device 81. The first authentication unit 87 stores the login success history information that is generated by collating the card ID of the IC card, which is transmitted from the MFP 1 on a login operation, with the address book 60 in the login success history 61 of the first server device 81.

The second server device 82 is a server device that performs a user authentication process corresponding to the process from step S13 to step S17 in the flowchart of FIG. 5. The second server device 82 includes the second authentication unit 90 that is the function implemented by the CPU by executing the user authentication program. The second server device 82 stores sets of login success history information on the given number of users from the latest login success history information, which is transmitted from the first server device 81, in the prioritized user list 52 of the second server device 82.

Operation of Authentication System of Third Embodiment

In the authentication system 94, the operation unit 20 of the MFP 1 transmits the address book 60*b* in which master information on each user is stored to the first server device 81 in advance. The first authentication unit 87 of the first server device 81 stores the transmitted address book 60*b* in the address book 60 of the first server device 81. The operation unit 20 of the MFP 1 transmits the card ID that is read from the IC card 5 of the user via the IC card I/F 29 on a login operation to the first server device 81 and the second server device 82.

The first authentication unit 87 of the first server device 81 collates the card ID that is transmitted from the MFP 1 with the address book 60 that is stored in the first server device 81 to perform user authentication. Then the first authentication unit 87 generates login success history information in which the user ID of the user who succeeded in a login, the card ID, and the login success date information are associated with one another and stores the login success history information in the login success history 61 of the first server device 81. Furthermore, the first authentication unit 87 of the first server device 81 reads sets of login success history information on the given number of users from the login success history information on the latest login success date from the login success history 61 and transmits the sets of login success history information to the second server device 82 via the network 40.

Furthermore, when the card ID transmitted from the MFP 1 is not registered in the address book 60, the first authentication unit 87 of the first server device 81 issues, to the MFP 1, a request for inputting user information, such as the user ID and the password. The first authentication unit 87 collates the user information transmitted from the MFP 1 in response to the input request with the user information in the address book 60 to perform user authentication. When an error in inputting user information is detected for multiple times as a result of user authentication, the first authentication unit 87 transmits the result of user authentication representing that the user is an authorized user to the MFP 1.

On the other hand, when the card ID transmitted from the MFP 1 is registered in the address book 60, this means that an IC card of a new unregistered card ID is used. The first authentication unit 87 therefore registers the new card ID, the user ID, and the password in the address book 60. Furthermore, the first authentication unit 87 notifies the MFP 1 of the new card ID, the user ID, and the password that are newly registered in the address book 60. The MFP 1 updates the address book (60*a*) that is stored in, for example, the HDD 14 of the main unit 10 according to the new card ID, the user ID, and the password that are notified.

Furthermore, the first authentication unit 87 generates the latest login success history information in which the new card ID, the user ID, and the login success date information are associated and registers the latest login success history information in the login success history 61. The first authentication unit 87 reads sets of login success history information on the given number of users from the set of login success history information on the latest login success date from the login success history 61 and transmits the login success history information to the second server device 82 via the network 40.

The second server device 82 stores the sets of login success history information on the given number of users that are transmitted from the first server device 81 in the prioritized user list 52. The second authentication unit 90 of the second server device 82 collates the card ID transmitted from the MFP 1 with the prioritized user list 52. When the card ID transmitted from the MFP 1 is in any one of the sets of login success history information in the prioritized user list 52, the second authentication unit 90 authenticates the user of the card ID, which is transmitted from the MFP 1, as an authorized user. The authentication result is then transmitted to the operation unit 20 of the MFP 1 via the network 40. When the operation unit 20 obtains the authentication result representing that the user is an authorized user from the second server device 82, the operation unit 20 communicates with the main unit 10 to enable the use of the MFP 1.

Effect of Third Embodiment

In the authentication system 94 of the third embodiment, because the first server device 81 and the second server device 82 share the user authentication process, the load of the MFP 1, the first server device 81, and the second server device 82 can be reduced significantly and the same effect as that from the above-described first embodiment can be obtained.

The above-described embodiments are represented as examples only and are not intended to limit the scope of the invention. These new embodiments can be carried out in various modes, and various omissions, replacements, and changes can be made within the scope of the invention.

For example, according to the descriptions of the embodiments, the invention is applied to the MFP 1 in which the operation unit 20 is detachable from and attachable to the main unit 10; however, the same effect as that described above can be obtained even with an apparatus, such as a MFP, in which an operation unit is fixed to a main unit.

Because the MFP 1 of the embodiments is an example to which the present invention is applied, the present invention may be applied to any device other than the MFP 1, such as a projector device, a TV conference system, or a digital camera, as long as the device performs user authentication.

According to the embodiment, an effect is achieved it is possible to prevent an inconvenience that the life of the device is shortened due to conduction on user authentication.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An apparatus comprising:
a main unit having a main unit operating system and processing circuitry configured to provide a function;
a reader configured to acquire authentication information from an authentication medium; and
an operation unit that is connected to the reader and is configured to be detachably connected to the apparatus, the operation unit having an operation unit operating system and including:
processing circuitry configured to
use the acquired authentication information from the reader to perform a user authentication process that enables the use of the function of the main unit if the user is authenticated; and
when the main unit transitions to a main unit energy-saving mode in which power consumption is reduced to a lowest available level of power consumption by the main unit by stopping power supply to a given hardware resource, cause the operation unit to transition to an operation unit energy-saving mode, which is separate and different from the energy-saving mode of the main unit and is above the lowest level of power consumption available for the operation unit, while the reader is kept in a driven state, and
when the reader acquires authentication information from the authentication medium, recover the operation unit from the operation unit energy-saving mode such that the processing circuitry of the operation unit performs the user authentication process.

2. The apparatus according to claim 1, wherein
the processing circuitry of the main unit performs, on transition to the main unit energy-saving mode, any chosen one of a first process of, after an engine of the main unit, which includes hardware for performing at least one of a scanning and printing function, enters a driven state, causing the main unit to transition to the main unit energy saving mode and a second process of, after information representing a current condition is stored in a memory, causing the main unit to transition to the main unit energy-saving mode in which power supply is limited to the memory.

3. The apparatus according to claim 2, wherein
the processing circuitry of the main unit performs, based on the user authentication process, any chosen one of a third process of causing the engine of the main unit to recover to the driven state and stand by if the user is authenticated and a fourth process of, based on the user authentication process, keeping the engine in a stopped state to implement the main unit energy-saving mode in which power consumption is the lowest if the user has not been authenticated.

4. The apparatus according to claim 1, the operation unit further comprising a communication interface configured to transmit the authentication information that is acquired by the reader from the authentication medium to an authentication server device on a given network,
wherein the processing circuitry of the operation unit uses an authentication result that is sent back from the authentication server device to perform the user authentication process.

5. The apparatus according to claim 4, wherein
the authentication server device includes at least a first server device and a second server device,
the first server device uses the authentication information that is transmitted from the communication interface to perform the user authentication process and transmits history information on an authentication result representing that a user is authenticated as an authorized user,
the second server device collates the history information that is received from the first server device with the authentication information that is transmitted from the communication interface to perform the user authentication process and transmits an authentication result, and
the processing circuitry of the operation unit uses the authentication result that is sent back from the second server device to perform the user authentication process.

6. An authentication process method performed by an authentication system including a main unit having a main unit operating system and processing circuitry configured to provide a function, a reader configured to acquire authentication information from an authentication medium, and an operation unit having an operation unit operating system and processing circuitry, the operation unit being connected to the reader and is configured to be detachably connected to the apparatus, the authentication process method comprising:
acquiring, by the reader, authentication information from an authentication medium;

using, by the processing circuitry of the operation unit, the acquired authentication information from the reader to perform a user authentication process that enables the use of the function of the main unit if the user is authenticated; and when the main unit transitions to a main unit energy-saving mode in which power consumption is reduced to a lowest available level of power consumption by the main unit by stopping power supply to a given hardware resource, causing, by the processing circuitry of the operation unit, the operation unit to transition to an operation unit energy-saving mode, which is separate from the main unit energy-saving mode and is above the lowest level of power consumption available for the operation unit, while the reader is kept in a driven state, and when the reader acquires authentication information from the authentication medium, recovering the operation unit from the operation unit energy-saving mode such that the processing circuitry of the operation unit performs the user authentication process.

7. The authentication process method according to claim 6, wherein
the processing circuitry of the main unit performs, on transition to the main unit energy-saving mode, any chosen one of a first process of, after an engine of the main unit, which includes hardware for performing at least one of a scanning and printing function, enters a driven state, causing the main unit to transition to the main unit energy saving mode and a second process of, after information representing a current condition is stored in a memory, causing the main unit to transition to the main unit energy-saving mode in which power supply is limited to the memory.

8. The authentication process method according to claim 7, wherein
the processing circuitry of the main unit performs, based on the user authentication process, any chosen one of a third process of causing the engine of the main unit to recover to the driven state and stand by if the user is authenticated and a fourth process of, based on the user authentication process, keeping the engine in a stopped state to implement the main unit energy-saving mode in which power consumption is the lowest if the user has not been authenticated.

9. The authentication process method according to claim 6, further comprising transmitting, by a communication interface of the operation unit, the authentication information that is acquired by the reader from the authentication medium to an authentication server device on a given network,
wherein, by the processing circuitry of the operation unit, an authentication result that is sent back from the authentication server device is used to perform the user authentication process.

10. The authentication process method according to claim 9, wherein
the authentication server device includes at least a first server device and a second server device,
by the first server device, the authentication information that is transmitted from the communication interface is used to perform the user authentication process and history information is transmitted on an authentication result representing that a user is authenticated as an authorized user,
by the second server device, the history information that is received from the first server device is collated with the authentication information that is transmitted from the communication interface to perform the user authentication process and an authentication result is transmitted, and
by the processing circuitry of the operation unit, the authentication result that is sent back from the second server device is used to perform the user authentication process.

11. A non-transitory computer program product containing an authentication process program executed by an authentication system, the authentication system including a main unit having a main unit operating system and processing circuitry configured to provide a function, a reader configured to acquire authentication information from an authentication medium, and an operation unit having an operation unit operating system and processing circuitry, the operation unit being connected to the reader and is configured to be detachably connected to the apparatus, the program causes the operation unit to execute
using the acquired authentication information from the reader to perform a user authentication process that enables the use of the function of the main unit if the user is authenticated; and
when the main unit transitions to a main unit energy-saving mode in which power consumption is reduced to a lowest available level of power consumption by the main unit by stopping power supply to a given hardware resource, causing, the operation unit to transition to an operation unit energy-saving mode, which is separate from the main unit energy-saving mode and is above the lowest level of power consumption available for the operation unit, while the reader is kept in a driven state, and
when the reader acquires authentication information from the authentication medium, recovering the operation unit from the operation unit energy-saving mode such that the processing circuitry of the operation unit performs the user authentication process.

12. The non-transitory computer program product according to claim 11, wherein
the processing circuitry of the main unit performs, on transition to the main unit energy-saving mode, any chosen one of a first process of, after an engine of the main unit, which includes hardware for performing at least one of a scanning and printing function, enters a driven state, causing the main unit to transition to the main unit energy saving mode and a second process of, after information representing a current condition is stored in a memory, causing the main unit to transition to the main unit energy-saving mode in which power supply is limited to the memory.

13. The non-transitory computer program product according to claim 12, wherein
the processing circuitry of the main unit performs, based on the user authentication process, any chosen one of a third process of causing the engine of the main unit to recover to the driven state and stand by if the user is authenticated and a fourth process of, based on the user authentication process, keeping the engine in a stopped state to implement the main unit energy-saving mode in which power consumption is the lowest if the user has not been authenticated.

14. The non-transitory computer program product according to claim 11, further comprising transmitting, by a communication interface of the operation unit, the authentication information that is acquired by the reader from the authentication medium to an authentication server device on a given network, wherein, by the processing circuitry of the operation unit, an authentication result that is sent back from the authentication server device is used to perform the user authentication process.

15. The non-transitory computer program product according to claim 14, wherein the authentication server device includes at least a first server device and a second server device, by the first server device, the authentication information that is transmitted from the communication interface is used to perform the user authentication process and history information is transmitted on an authentication result representing that a user is authenticated as an authorized user, by the second server device, the history information that is received from the first server device is collated with the authentication information that is transmitted from the communication interface to perform the user authentication process and an authentication result is transmitted, and by the processing circuitry of the operation unit, the authentication result that is sent back from the second server device is used to perform the user authentication process.

\* \* \* \* \*